(12) United States Patent
Thatcher et al.

(10) Patent No.: US 6,505,093 B1
(45) Date of Patent: Jan. 7, 2003

(54) AUTOMATED ORDER FILLING METHOD AND SYSTEM

(75) Inventors: James L. Thatcher, Easton, PA (US); Allen Easterling, Alpharetta, GA (US)

(73) Assignee: SI Handling Systems, Inc., Easton, PA (US)

(*) Notice: Subject to any disclaimer, the term of this patent is extended or adjusted under 35 U.S.C. 154(b) by 0 days.

(21) Appl. No.: 09/563,871

(22) Filed: May 3, 2000

(51) Int. Cl.[7] ............................. G06F 7/00; G06F 17/00
(52) U.S. Cl. .................. 700/216; 700/217; 700/231; 700/214; 700/242; 700/243
(58) Field of Search ................................. 700/217, 214, 700/230, 228, 216, 218; 294/228, 2, 67.32, 81.52

(56) References Cited

U.S. PATENT DOCUMENTS

| | | | |
|---|---|---|---|
| 3,982,642 A | 9/1976 | Muller ...................... 214/301 |
| 4,366,905 A | 1/1983 | Forshee .................... 206/511 |
| 4,501,528 A | 2/1985 | Knapp ....................... 414/273 |
| 4,542,808 A | 9/1985 | Lloyd, Jr. et al. ............ 186/56 |
| 4,750,769 A | * 6/1988 | Tebb ........................ 294/86.4 |
| 4,975,018 A | * 12/1990 | Langenbacher et al. .... 414/751 |
| 5,271,703 A | 12/1993 | Lindqvist et al. ........... 414/268 |
| 5,377,097 A | * 12/1994 | Fuyama et al. ............. 364/401 |
| 5,553,442 A | * 9/1996 | Fadaie ........................ 53/445 |
| 5,564,879 A | 10/1996 | Noguchi .................... 414/268 |
| 5,636,966 A | 6/1997 | Lyon et al. ............... 414/791.6 |
| 5,727,832 A | 3/1998 | Holter ...................... 294/64.1 |
| 5,752,729 A | * 5/1998 | Crozier ......................... 294/2 |
| 5,934,859 A | * 8/1999 | Goetzel Mann ........... 414/416 |
| 6,011,998 A | 1/2000 | Lichti et al. ................ 700/230 |
| 6,015,174 A | 1/2000 | Raes et al. ..................... 294/2 |
| 6,082,080 A | * 7/2000 | Holter et al. ................. 53/540 |
| 6,181,979 B1 | * 6/2001 | Murakami ................. 700/216 |

\* cited by examiner

*Primary Examiner*—Donald P. Walsh
*Assistant Examiner*—Michael E Butler
(74) *Attorney, Agent, or Firm*—Drinker Biddle & Leath LLP

(57) ABSTRACT

A method of automatically picking items to fill a purchase order. A purchase order is received and information about the identity and quantity of items ordered in the purchase order is extracted from it. A pick list is created from the extracted information a pick list, and the pick list is associated with a receptacle for receiving picked items. A determination is made whether ordered items are of a first type or a second type. If no item of the second type is ordered, the receptacle is directed to a first location where items of the first type are stored and ordered items stored at the first location are automatically picked and placed in the receptacle. If at least one item of the second type is ordered, the receptacle is first directed to a second location where items of the second type are stored. Items stored at the second location re automatically picked and placed in the receptacle and, if at least one item of the first type is also ordered, the receptacle is next directed to a first location where items of the first type are stored. Ordered items stored at the first location are then automatically picked and placed in the receptacle and the receptacle is directed to a location for further processing. If no item of the first type is also ordered, the receptacle is directed to a location for further processing after items stored at the second location have been picked and placed in the receptacle.

17 Claims, 15 Drawing Sheets

AUTOMATED ORDER FILLING METHOD AND SYSTEM

FIELD OF THE INVENTION

This invention relates to the automated filling of orders for goods, and more particularly to the filling of orders requiring a mix of individual items which can be characterized as either high demand or low demand items, i.e., where some items are ordered frequently and other items are ordered less frequently.

BACKGROUND OF THE INVENTION

Traditional catalog telephone and mail order sales, and now so-called "e-commerce" sales over the Internet, require retailers to pick ordered items from inventory and accumulate those items into a receptacle or defined location for packaging and shipping to the customer. The simplest, and probably the earliest, system for picking items requires a person, usually referred to as an order picker, to physically search through inventory stored in a warehouse, guided by a list of items required to fill an order. The order picker is required to locate and transfer ordered items to a receptacle or a defined accumulation area where picked items are collected, matched to a specific order, and packed and prepared for shipping to the customer. The cost of such a system is high because it relies heavily on manual labor, and is subject to inefficiencies due to inevitable human error in picking and assembling items to fill an order.

To assist the order picker, and to help track inventory, item identification systems called "pick to light" systems were developed, in which a controller received information identifying items to be picked to fill an order and sequentially or simultaneously activated lights at locations containing items to be picked to fill the order. Guided by the lights, the order picker would move from location to location, remove the required items from the illuminated locations, manually indicate the removal of the items, such as by pressing a switch (which would usually also turn off the light), and then place the items into a receptacle assigned to receive items to fill the order. A benefit of this system was the integration of an inventory tracking system, which allowed inventory records to be decremented each time the order picker pressed the switch or otherwise indicated that an ordered item had been removed from inventory. Such systems nevertheless are limited by their reliance on human order pickers, and are prone to error and fraud.

To improve efficiencies and reduce errors, dedicated dispensers for dispensing individual items were developed. Such a dispenser is disclosed in U.S. Pat. No. 5,271,703, assigned to the same assignee as the present invention. That patent describes a dispenser which uses a plurality of magazines, each stocked with items offered for sale. Items required to fill a purchase order are selectably dispensed from individual magazines into a dynamically assigned order space on a conveyor belt, which accumulates in the order space those items necessary to fill an order. Once all required items are dispensed into the dynamically assigned space on the conveyor belt, the belt moves the items to a second conveyor, which moves the items in a group to a packing station. Variations of that dispenser-based system dispense items directly into passing receptacles or shipping containers, instead of into a defined space on a moving belt.

The use of individual dispensers of inventoried items, such as described in U.S. Pat. No. 5,271,703, clearly requires a dedicated dispensing machine for each item to be dispensed. For some items, the low frequency with which the item is requested by purchasers does not justify the cost of a dedicated dispensing machine. To avoid the cost of dispensing machines for slow selling items, those items were previously picked manually and placed in a receptacle, and then the receptacle was sent to the dispensing machinery where frequently ordered items were automatically dispensed into the receptacles. Such hybrid manual and automated systems reduced, but did not entirely eliminate, the disadvantages inherent in manual order picking.

Moreover, all prior order picking systems, whether manual only or both manual and automatic, need to be replenished when the supply of ordered items runs low or is exhausted. Until now, replenishment was done manually. That is, an individual was required to bring items to their assigned locations within inventory and load the items one at a time into dispensing magazines (or at least replace an empty magazine with a full one) or place the items into a storage bin. The manual replenishment process, like the picking process, is inherently inefficient and prone to errors.

There remains a need for a fully automated order picking system which is able to dispense both high volume (i.e., frequently ordered) and low volume (i.e., infrequently ordered) items with minimal reliance on manual labor in both picking and replenishment of items. The present invention fills that need.

SUMMARY OF THE INVENTION

In one of its aspects, the invention encompasses a method of automatically picking items to fill a purchase order. A purchase order is received and information about the identity and quantity of items ordered in the purchase order is extracted from it. A pick list is created from the extracted information a pick list, and the pick list is associated with a receptacle for receiving picked items. A determination is made whether ordered items are of a first type or a second type. If no item of the second type is ordered, the receptacle is directed to a first location where items of the first type are stored and ordered items stored at the first location are automatically picked and placed in the receptacle. If at least one item of the second type is ordered, the receptacle is first directed to a second location where items of the second type are stored. Items stored at the second location re automatically picked and placed in the receptacle and, if at least one item of the first type is also ordered, the receptacle is next directed to a first location where items of the first type are stored. Ordered items stored at the first location are then automatically picked and placed in the receptacle and the receptacle is directed to a location for further processing. If no item of the first type is also ordered, the receptacle is directed to a location for further processing after items stored at the second location have been picked and placed in the receptacle.

In another of its aspects, the invention is a system for automatically picking items to fill a purchase order, and comprises at least one receptacle for receiving items ordered in the purchase order, the receptacle having associated with it unique identifying information; a conveyor for moving the receptacle along a preselected path; a detector along the path for detecting the unique identifying information associated with the receptacle and generating an output signal representative of that information; a system controller which (a) receives the detector output signal and information about the identity and quantity of items ordered in the purchase order, (b) correlates the unique identifying information with the information about the identity and quantity of items ordered in the purchase order, and (c) generates commands; a first location along a first portion of the path of the conveyor for storing items of a first type; a second location along a second portion of the path of the conveyor for storing items of a second type; a director responsive to a command from the controller to direct a receptacle onto the second portion of the path when items of the second type are ordered in the purchase order; at least one picking robot at the second storage location responsive to a command from the controller to pick items of the second type ordered in the purchase order and place the items in the receptacle; and at least one dispenser at the first storage location responsive to a command from the controller to dispense items of the first type ordered in the purchase order into the receptacle.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DESCRIPTION OF THE PREFERRED EMBODIMENT

Figure 1:
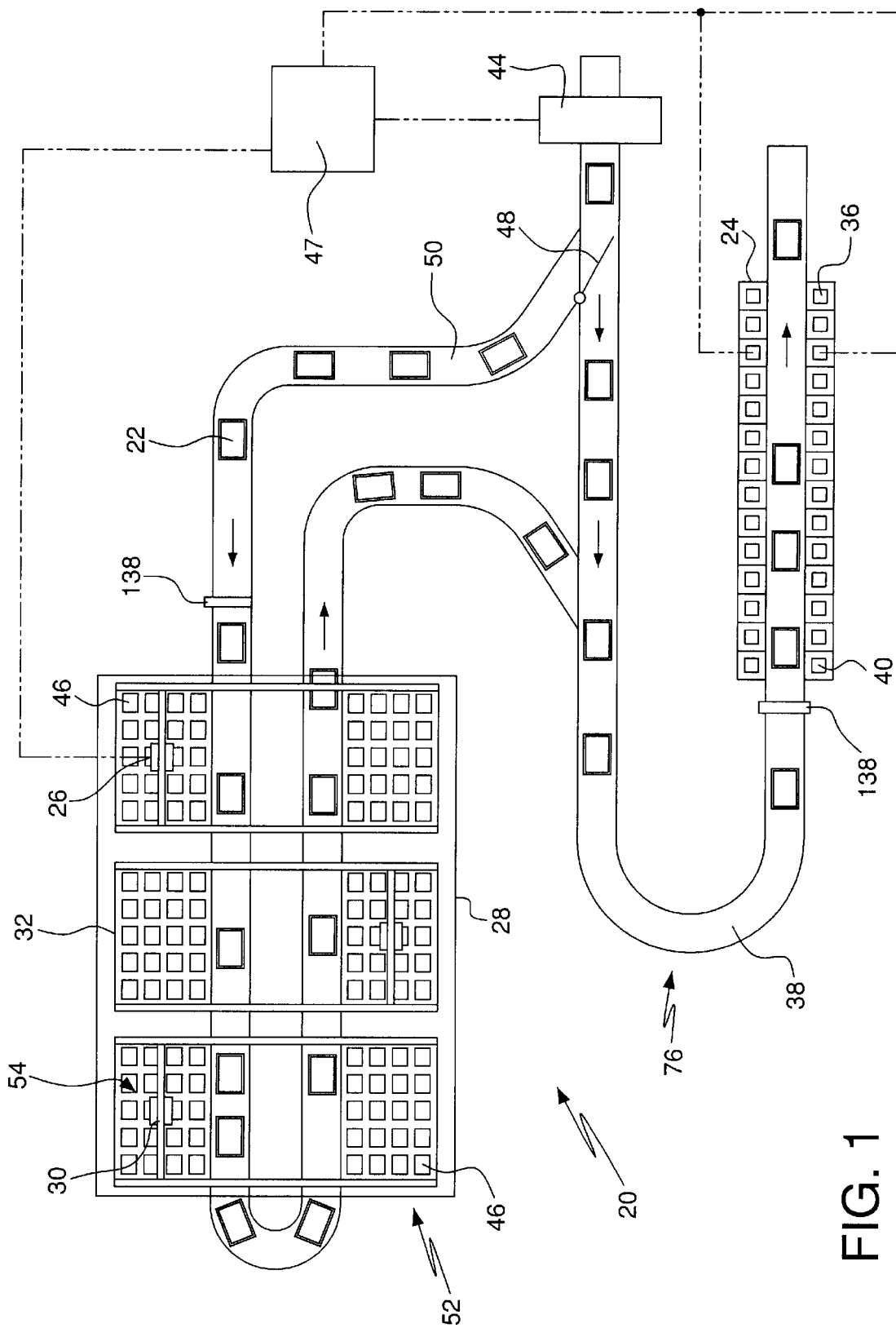
FIG. 1 is an overhead view, in greatly simplified form, of an order picking system embodying the present invention.

Referring to the drawings, wherein like numerals indicate like or corresponding elements throughout the several views, an embodiment of the invention as presently preferred is illustrated in greatly simplified form in FIG. 1. For purposes of illustration, and not by way of limitation, the invention will be shown and described with reference to handling compact discs (CDs) on which music or other content is recorded, and which are inventoried and picked for shipment to customers in fulfillment of customer orders. Of course, it should be understood that the present invention is not limited to handling CDs or any other specific items, but is applicable generally to handling a wide variety of items. It is within the capabilities of those skilled in the art to modify the invention from the exact forms illustrated in order to adapt it to items other than CDs.

Overview

One embodiment of an automated order filling system 20 according to the present invention is illustrated in FIG. 1. The system accumulates items such as, for example, CDs required to fill a customer order into a receptacle 22. (Although the invention is described and illustrated in terms of a receptacle in the form of a tote or other container, it should be understood, however, that the term "receptacle" as used in the specification and claims is intended to be interpreted broadly to include not only a container but, in addition, a defined space on a conveyor, for example.) The receptacle 22 is transported through the order filling system 20 by conveyors, described in more detail below. System 20 includes a plurality of dedicated dispensers 24 located in one area for rapidly dispensing high volume items and robotic picking equipment 30 in a separate area for picking low volume items, i.e., those items which are ordered less frequently than high volume items.

A specific customer purchase order is associated with a specific receptacle 22, as will be explained more fully below. As a specific receptacle 22 passes through the order filling system 20, specific items or CDs 36 are placed into the receptacle 22 until all items required to fill the customer order have been placed in the receptacle. Once all of the items required to fill the order are accumulated in the receptacle 22, the receptacle 22 can be transported to a location for order checking or packing.

As can be seen in FIG. 1, the system 20 includes a first conveyor 38, referred to herein as a dispenser conveyor, which transports receptacles 22 past dedicated dispensers 24 for dispensing high volume items 40. The receptacles 22 each include a unique identifier 42 (shown in FIG. 2) such as a bar code that allows an identification station 44 at the entrance end of dispenser conveyor 38 to determine the unique identity of that receptacle 22. A specific purchase order can be associated with the receptacle 22, so that only those items required to fill the specific purchase order are placed in the receptacle 22 by the order filling system 20.

The dedicated dispensers 24 preferably comprise a supply of a specific item, or CD, along with a mechanism to dispense one or more items into a receptacle 22 as receptacle 22 moves along the path of conveyor 38. A suitable dispenser 24 is disclosed in U.S. Pat. No. 5,271,703. However, other forms of dispensers can be used without departing from the scope of the invention. The dedicated dispensers provide rapid dispensing of items, although as a practical matter the cost of purchasing and operating such machinery is only cost effective when a large enough quantity of the items at a high dispensing rate is required.

The automated order filling system 20 also includes a second conveyor 50, referred to as an inventory area conveyor, which transports receptacle 22 through an inventory area 28 in which are stored low volume items, i.e., items which are ordered infrequently compared to high volume items dispensed by dispensers 24. Low volume items 46 are stacked or otherwise grouped in a plurality of storage sections 32. Inventory area 28 has associated with it at least one robotic picker 30, referred to as a gantry robot. A general description of gantry robots is provided in the *Handbook of Industrial Robots*, Chapter 60, John Wiley & Sons, Inc., 1985. Each gantry robot 30 includes an end effector capable of picking up at least one low volume item from its storage location and transporting it to another location within a defined range of movement. For purposes of illustration, and not limitation, the end effector described herein is in the form of a vacuum pickup 34, which uses suction to pick up a low volume item 46 from one location and move it to another location. Although three gantry robots are illustrated in FIG. 1, it will be understood that only one gantry robot 30 is needed to transfer items 46 from a storage section 32 to a receptacle 22. Of course, the speed with which any gantry robot 30 can move items 46 is limited, so it may be advantageous to employ a plurality of such robots. However, it will be understood that the invention is not limited to any specific number of gantry robots.

When a purchase order requires a low volume item 46, the receptacle 22 associated with the order is directed by a diverter 48 onto inventory area conveyor 50, which transports the receptacle 22 through inventory area 28. Diverter 48 may comprise a swing gate to redirect the receptacle 22 onto the inventory area conveyor 50. Alternatively, a push bar can be extended to push the receptacle 22 onto the inventory area conveyor 50. Other suitable devices for directing receptacles from conveyor 38 to conveyor 50 can also be used without departing from the invention.

In the embodiment shown, the inventory area 28 is made up of several storage sections 32, each of which is serviced by a gantry robot 30. The inventory area conveyor 50 is arranged to pass through the middle of inventory area 28 to minimize the average distance from any given point in the inventory area 28 to a receptacle 22 on the inventory area conveyor 50. As a receptacle is transported by inventory area conveyor 50, one or more low volume items 46, as may be required by the order associated with the receptacle, are picked up by one or more of the gantry robots 30 and placed in the receptacle 22.

If all of the low volume items 46 required to fill a purchase order need to be picked from a single storage section 32, the time available for a gantry robot 30 to pick each item for that purchase order can be limited by the amount of time during which the receptacle 22 associated with that purchase order is present within inventory area 28 and during which low volume items 46 can be placed in the receptacle 22 by the gantry robot 30. Moreover, more than one receptacle 22 may be within the inventory area 28 at any given time, which can mean that there is insufficient time for the gantry robot 30 to pick up and transfer multiple low volume items 46 to multiple receptacles 22 while those receptacles are within the inventory area.

To minimize such problems, the preferred embodiment of the invention routes the inventory area conveyor 50 through the center of the inventory area 28, between storage sections 32. In addition, after passing through inventory area 28 a first time, the inventory area conveyor 50 makes a 180 degree turn and passes through the inventory area 28 a second time. The 180-degree turn of the inventory area conveyor 50 directs the inventory area conveyor 50 back between storage sections 32. This provides, in effect, twice as much time to place picked items in a receptacle. This allows items which are temporarily out of stock in the storage section 32 to be replenished between the first and second passes of a receptacle 22 between storage sections 32. Also, picks of a particular low volume item 46 can be deferred from the first pass of a receptacle to the second pass, to allow the system to prioritize the picking of low volume items 46 between the first and second passes so as to maximize the number of picks that the gantry robot 30 can accommodate in a given time period.

After they have passed completely through the inventory area 28, receptacles 22 are returned to the dispenser conveyor 38. The receptacles 22 then are transported past several dedicated dispensers 24, which dispense high volume items 36 that may still be required to fill a purchase order associated with the receptacles 22. As a receptacle 22 passes each dedicated dispenser 24, the dedicated dispenser 24 dispenses an item 36 to the receptacle 22 when an item in the dispenser is required for a customer order associated with the receptacle 22.

After all required high volume and low volume items have been picked and placed into a receptacle, the receptacle is transported to a location where the items may be checked and packed for shipment.

Inventory Area

As shown in FIG. 1, the inventory area 28 may be divided into several storage sections 32. Each storage section 32 is served by a gantry robot 30. A gantry robot may serve only a single storage section, or may serve a plurality of storage sections. In the illustrated embodiment, one gantry robot 30 serves two storage sections 32. As those skilled in the art will appreciate, the number of storage sections 32 that can be served by a gantry robot 30 depends on a number of factors, including the size of the robot, its range of motion, the desired speed with which items are to be picked, the number of individual low volume items to be stored, and the space available.

Figure 2:
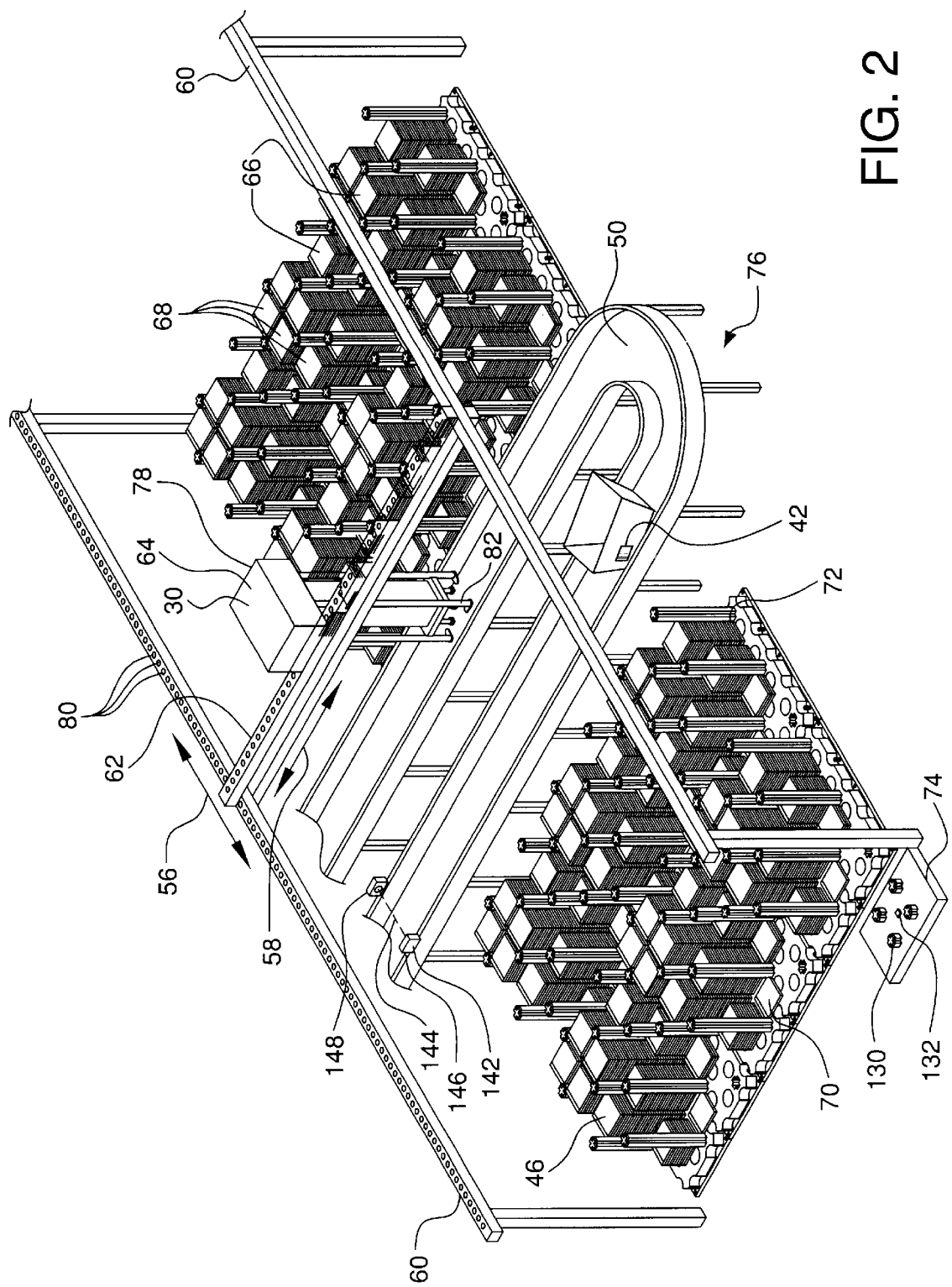
FIG. 2 is a perspective view of a portion of the system illustrated in FIG. 1, showing a storage section including a gantry robot.

The gantry robot 30 is arranged to move in three orthogonal axes. As shown in FIG. 2, the first axis 56 and second axis 58 are in a horizontal plane, substantially parallel to the floor of the inventory area 28, so that the robot is capable of movement in perpendicular x and y directions. To enable the x-y movement, two spaced-apart overhead rails 60, which are perpendicular to the direction of movement of inventory area conveyor 50 in the illustrated embodiment, are provided. The overhead rails 60 provide a track for a pair of movable crossbeams 62, which span the overhead rails 60 and are movable in unison in a direction parallel to the overhead rails 60. The movable crossbeams 62 provide a track for a robot head 64, which is movable in a direction perpendicular to the overhead rails 60 and parallel to the direction of movement of inventory conveyor 50. Suitable drive mechanisms may be provided to effect movement of the crossbeams 62 along rails 60 and movement of robot head 64 along crossbeams 62, as will be understood by those skilled in the art. As illustrated in FIG. 2, the robot head 64 may include a drive mechanism 78 which moves the robot head 64 to traverse the movable crossbeams 62. Position references 80 are included on rails 60 and crossbeams 62 to provide information regarding the position of the robot head 64 to suitable command and control systems to drive the robot head 64.

As can be seen in FIG. 2, low volume items 46 are organized within a storage section 32 in rows 66 and columns 68. The intersection of each row 66 and column 68 defines a cell 70 for a stack 72 of specific items. The columns 68 and rows 66 are arranged parallel to the overhead rails 60 and moving crossbeam 62, respectively, such that motion of the moving crossbeam 62 is parallel to the columns 68 and motion of the robot head 64 along the moving crossbeam 62 is parallel to the rows 66.

Figure 3:
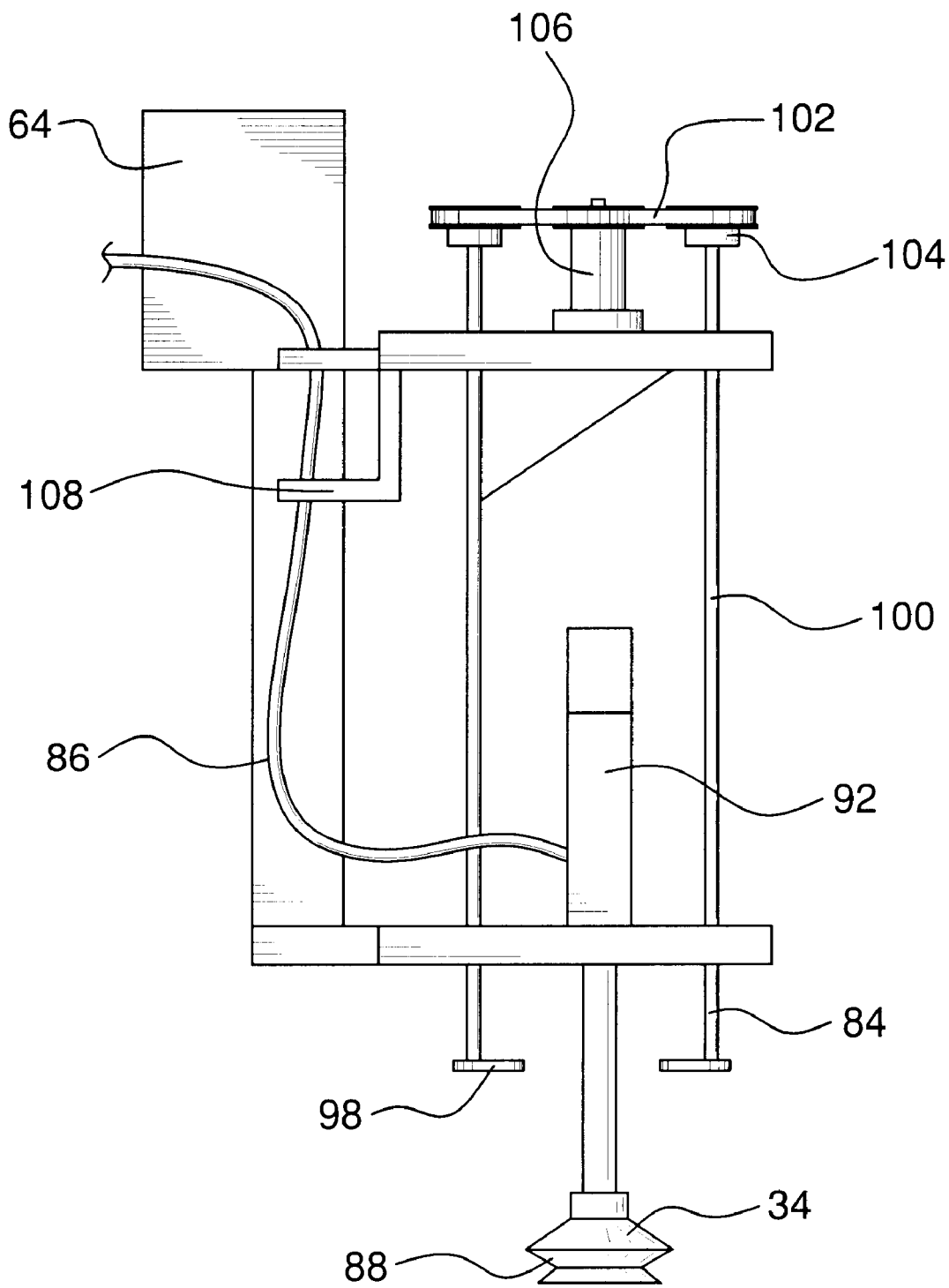
FIG. 3 is a side view of a gantry robot head.

As shown in FIG. 3, the robot head 64 may include an end effector 34 in the form of a vacuum tip which can pick up by suction individual low volume items 46 from a stack 72 of such items located at a cell 70. Other end effectors can be used, as will be explained in more detail below. The end effector, in this case the vacuum tip, 34 is movable vertically, by an extension and retraction mechanism 92. Any suitable mechanism for extending and retracting vacuum tip 34 may be used, such as a fluid-pressurized cylinder, a rack and pinion, a mechanical linkage, and the like. The vertical movement of the vacuum tip 34 provides motion of the gantry robot 30 in the z direction, which is mutually orthogonal to both the x and y directions. When a specific low volume item 46 is required to fill an order, a system controller 47 for the order filling system 20 causes the moving crossbeam 62 to move to a position corresponding to the row 66 containing the low volume item, and the robot head 64 to move to a position corresponding to the column 68 location of the specific low volume item 46. The vacuum pickup 34 is then moved downward until it engages the low volume item 46 and applies suction to it. Once the low volume item 46 is engaged and held by suction, the vacuum pickup 34 is raised, and the robot head 64 moves to a point over the location on conveyor 50 of the receptacle 22 into which the item 46 is to be placed, where the suction is released and the low volume item 46 is dropped into the receptacle.

Dual Purpose End Effector

Figure 4:
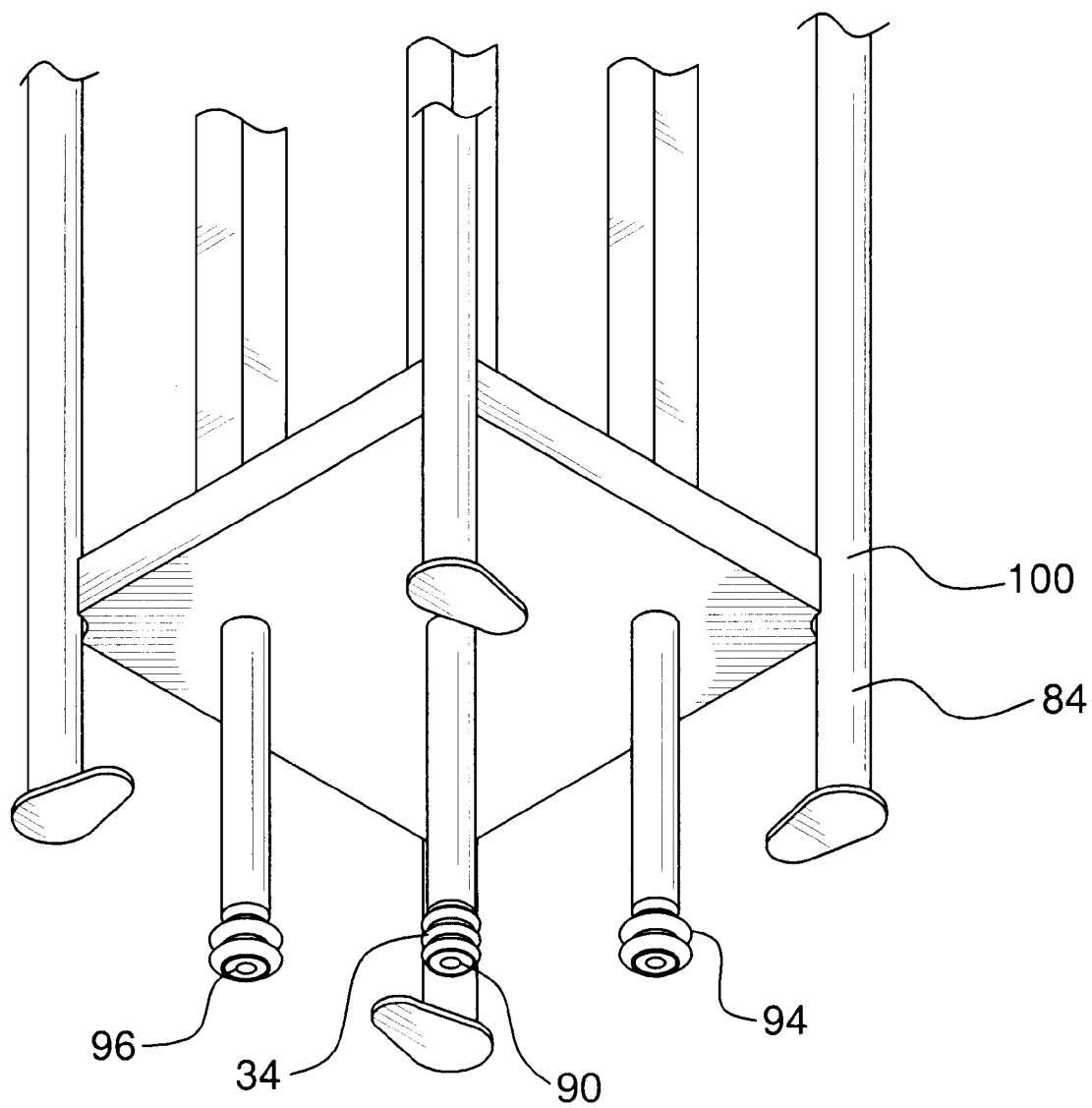
FIG. 4 is an isometric view, from below, of a portion of the robot head illustrated in FIG. 3, showing the robot head manipulators.

Depending from the robot head 64 is an end effector 34, which can take any one of a number of forms depending upon particular low volume items to be stored and picked from inventory area 28. The robot head 64 of the described embodiment is therefore of the multi-purpose type, in that the gantry robot 30 is able to present several types of end effectors for handling low volume items 46 within the storage section 32. As shown in FIGS. 3 and 4, two preferred end effectors are a vacuum pickup 34 for picking individual low volume items 46 and a set of rotatable fingers 84 for grasping a stack 72 of low volume items 46.

As shown in FIGS. 3 and 4, the vacuum pickup 34 comprises a vacuum line 86 connected to a source of suction (not shown, but which may be a conventional vacuum source) at one end and to a flexible boot 88 at the other. The flexible boot 88 has a free end in which is located an aperture 90 (shown in FIG. 4). The interior of flexible boot 88 is hollow, so that suction from the suction source is transmitted to aperture 90. A linear actuator 92 is provided to raise and lower the flexible boot 88.

In order to pick up an individual item from a stack 72 of items, the flexible boot 88 is lowered by actuator 92 until it comes into contact with the item 46 to be picked. At that point, the free end of boot 88, and thus aperture 90, is in contact with the top surface of item 46. Because boot 88 is flexible, it can deform to create a seal between the boot 88 and the item 46 around the aperture 90. Once the flexible boot engages the item, actuator 92 is operated to raise boot 88. Suction from the suction source is transmitted to aperture 90, and will hold the low volume item 46 against the flexible boot 88 as the flexible boot 88 is raised.

Once item 46 is raised and held by flexible boot 88, robot head 64 can be moved to a point over a receptacle 22 on conveyor 50. To release the item 46 and drop it into a desired receptacle, the suction source is disconnected from the flexible boot 88, thus removing the suction which holds the item 46 against the flexible boot 88 and allowing the item 46 to drop.

As those skilled in the art will understand, not all low volume items 46 are necessarily of the same size or weight. Thus, the amount of suction necessary for robot head 64 to lift and hold an item 46 may need to vary depending upon the size and weight of item 46. In addition, the size of flexible boot 88 and the size of the aperture 90 in flexible boot 88 may be varied as required by the size and weight of items to be picked. A larger vacuum effector with a larger aperture allows a greater suction force to be applied to an item. Still further, more than one vacuum effector may be used, as illustrated in FIG. 4, for example. Larger vacuum effectors, or multiple vacuum effectors, can be used for such operations as, for example, picking multiple disk CDs, i.e., musical albums which comprise two or three compact disks. Larger vacuum effectors or multiple vacuum effectors can be used to pick larger, heavier items, while smaller vacuum effectors can be used to pick smaller, lighter items.

In addition to a vacuum effector 34 for picking individual low volume items 46, the robot head 64 is preferably, although not necessarily, provided with a set of rotatable fingers 84 for picking up stacks 72 of low volume items 46 when it is desired to replenish the supply of low-volume items in inventory area 28. In the preferred embodiment, four such rotatable fingers are illustrated, although as those skilled in the art will understand, more or fewer fingers may be preferred, depending on the type of item being handled. Each rotatable finger 84 comprises a shaft 100, which has at its lower end a foot 98, which can be rotated underneath a stack 72 of low volume items 46. The foot 98 is off-center with respect to the longitudinal axis of the shaft, and projects transversely from one side of the shaft. Thus, rotation of the shaft 100 causes the direction in which foot 98 extends relative to robot head 64 to also rotate. As shown in FIG. 3, in the illustrated embodiment the shafts 100 are rotated by a belt 102 wound around pulleys 104 attached to the top end of the shafts 100. The belt 102 is driven by a stepper motor 106. Other mechanisms for rotating shafts 100, such as gear arrangements or even direct drive by a motor, for example, can also be used without departing from the scope of the invention.

Figure 5:
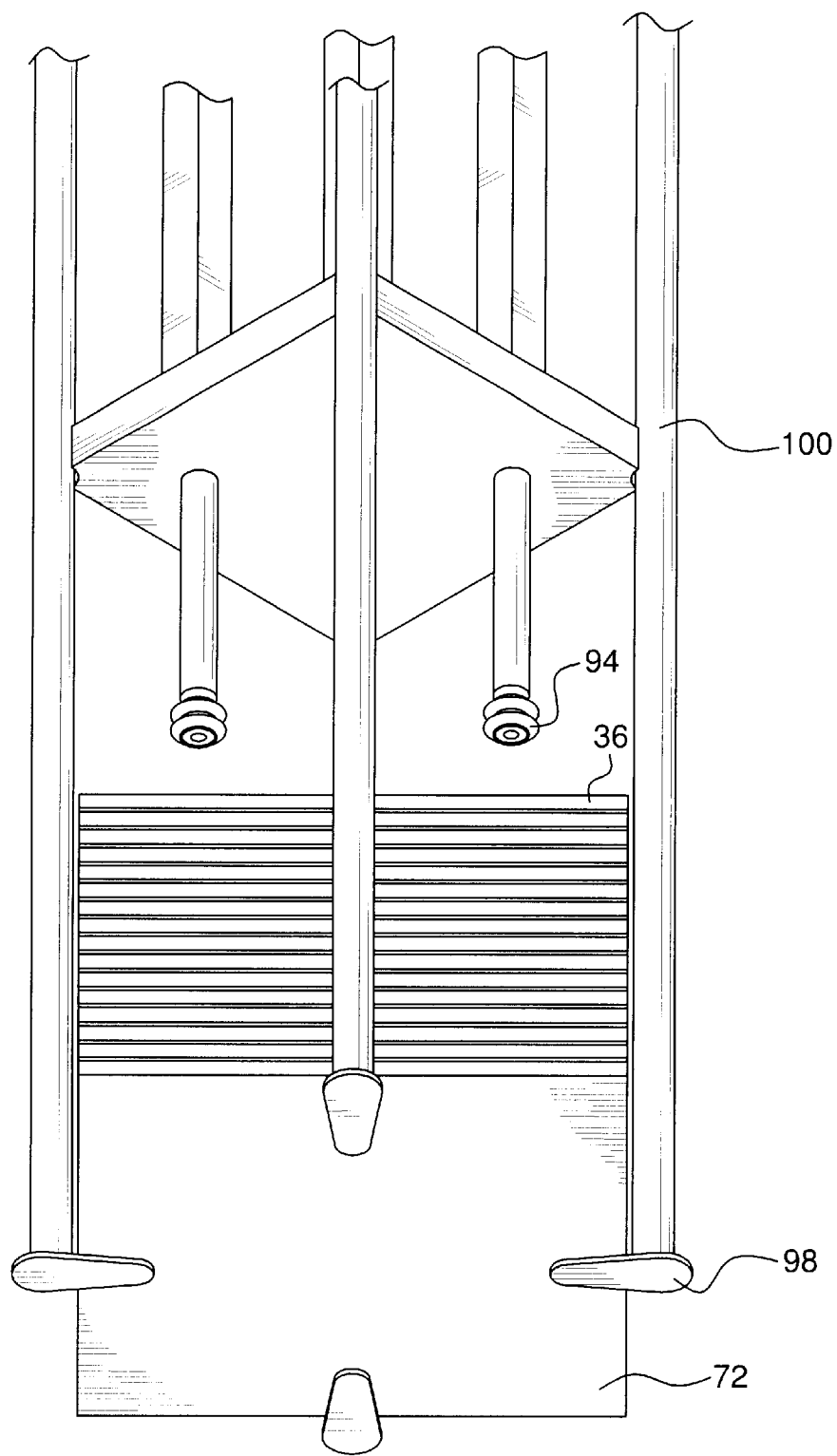
FIG. 5 is an isometric view, from below, of the robot head illustrated in FIG. 3, shown holding a stack of items for replenishment.
Figure 6:
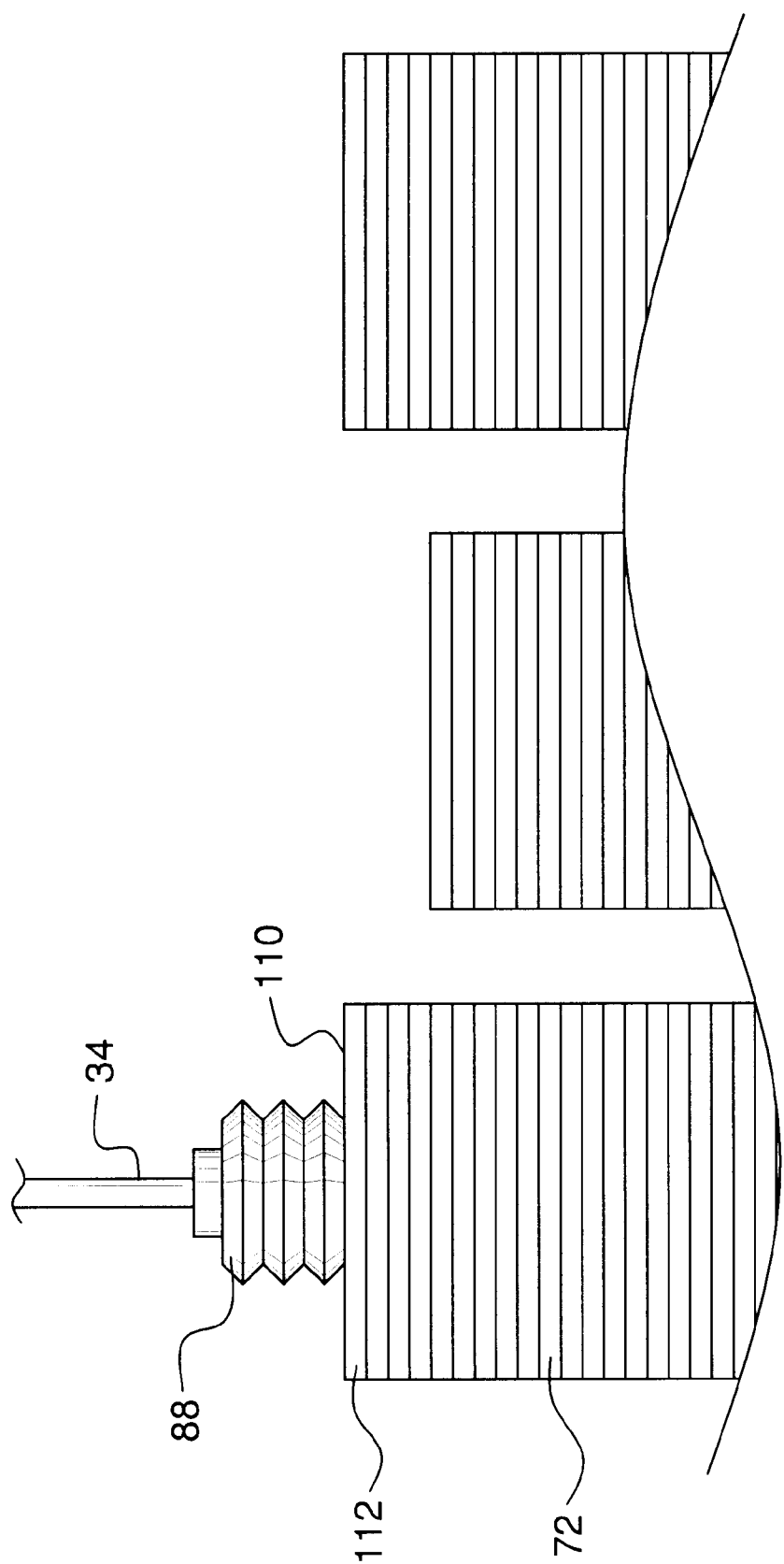
FIG. 6 is a side view of a vacuum end effector for a robot head as illustrated in FIG. 3, shown engaging an item to be picked up and transported by the robot head.

As shown in FIG. 3, rotatable fingers 84 are vertically movable independent of the vacuum effectors. The rotatable fingers 84 can be raised to position feet 98 are above the vacuum effectors, so that they are out of the way and do not interfere with operation of the vacuum effectors during picking. When it is desired to have robot head 64 grasp a stack 72 of low volume items 46, such as when it is desired to replenish the supply of a particular item in the inventory area 28, the rotatable fingers 84 are lowered to extend below the vacuum effectors. The vertical movement of rotatable fingers 84 allows the feet 98 to be placed below the bottommost item 46 in a given stack 72. Rotation of the shafts 100 allows the feet 98 to extend under the bottommost item, as shown in FIG. 5, such that feet 98 engage the bottom surface of the bottommost item, thus enabling robot head 64 to grasp and lift a stack 72 of items 46.

Matrixed Racks

In order for a gantry robot 34 to pick a low volume item 46 from a stack 72 within a storage section 32 and transfer the item 46 to a receptacle 22, the gantry robot 30 must be able to locate specific low volume items 46 required to fill a customer order. To facilitate locating specific items, the storage sections 32 of the illustrated embodiment are organized into a matrix arrangement of rows 66 and columns 68 of stacks 72 of low volume items 46. That enables the location of a stack of specific low volume items 46 to be defined by x and y, or row and column, coordinates within the matrix.

The gantry robot must also know the height, or z coordinate, of the top surface 110 of the topmost item 112 in the stack 72 from which a specific low volume item 46 is to be picked. If the vacuum effector 34 is lowered too far, damage to at least the topmost item in the stack 72 can occur. On the other hand, if the vacuum effector 34 is not lowered far enough, the flexible boot 88 will not contact the top item 112 to be picked. This can result in the topmost item remaining on the stack 72 which, in turn, can result in inaccurate inventory tracking.

The top surface 110 of the top item 112 to be picked can be determined either by actively sensing the proximity of a vacuum effector 34 to the topmost item 112, or by predicting the height of the top item 112 based on the inventory count of items 46 remaining in the stack 72.

Storage Sections

Figure 7:
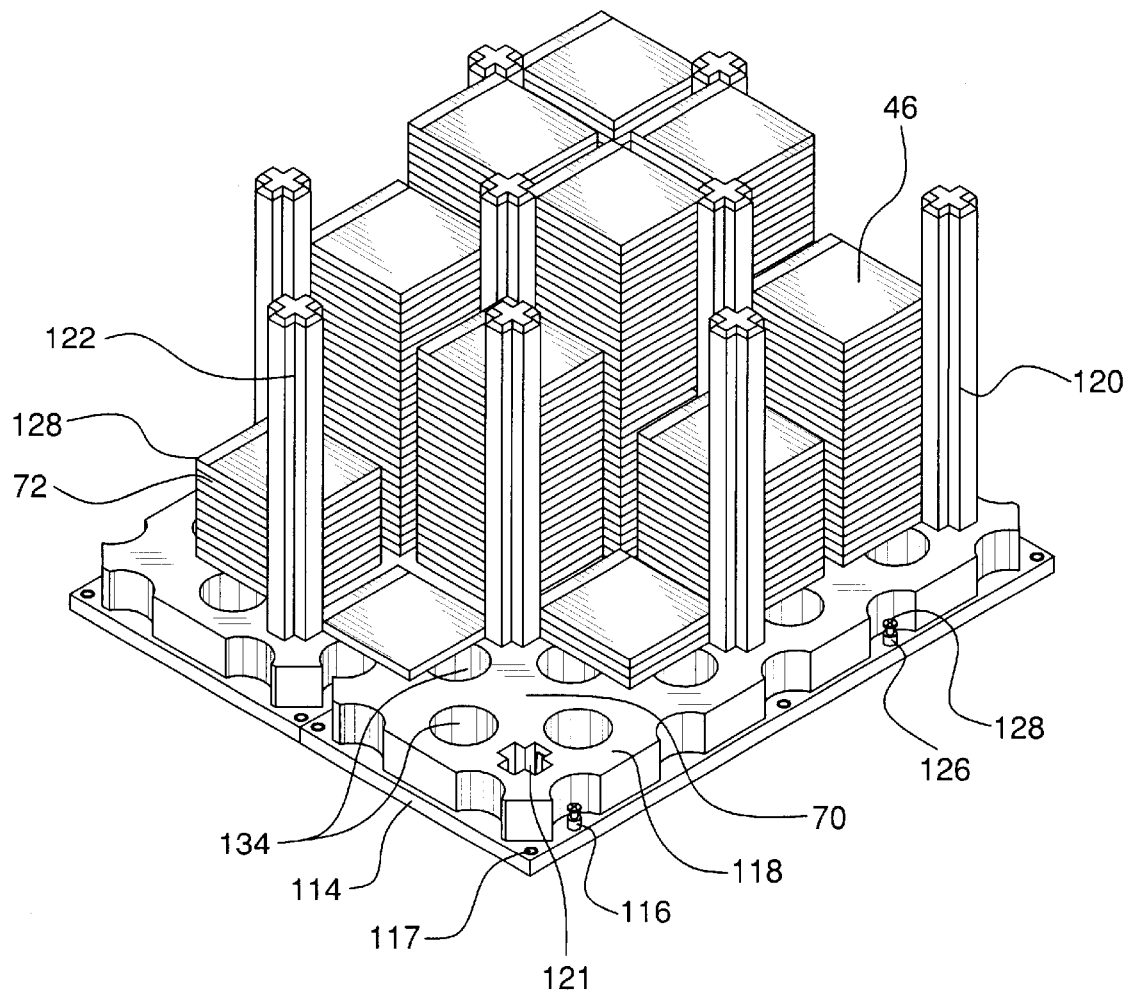
FIG. 7 is a perspective view of a section of an inventory area for an order picking system according to the invention, showing stacks of items supported on a base and located by cruciform stanchions.

As shown in FIG. 7, a storage section 32 of the described embodiment comprises at least one base plate 114. To form larger storage areas, a plurality of base plates 114 can be interlocked together with adjacent base plates. Each base plate has at least one leveler 116 for leveling the base plates 144, and has at least one mounting hole 117 for attaching the base plates 114 to a floor. The leveler 116 comprises a threaded screw or bolt 128 which cooperates with a correspondingly threaded bushing 126 in an aperture in the base plate 114. The screw 128 is long enough to extend through the base plate and engage the floor below. Rotating the screw 128 raises or lowers the base plate 114 relative to the floor, in known manner. Preferably, a leveler 116 is located adjacent to each corner of the base plate 114 to facilitate the adjustment of the base plate 114 to a level position.

Keeping the base plates 114 level relative to the gantry robot 30 is important to ensure free movement of robot head 64 in the z direction when picking items 46 or replenishing stacks 72 of items. If the base plates 114 are not level, then the stacks 72 will not be vertical. This could result in interference or binding between robot head 64 and adjacent stacks 72 of items 46 as the robot head moves up and down in the z direction.

Supported by each base plate 114 is a pallet 118. Each pallet has a top surface which supports stacks 72 of items 46. Each pallet has a preselected thickness, so that the top surface is raised above the surface of base plate 114. Preferably, the pallets are hollow, and may conveniently be made of a moldable material using a vacuum molding process. Each pallet has a plurality of circular openings or recesses 134 which provide room for feet 98 of robot head 64 to rotate when replenishing stacks of items.

Cells 70 within a storage section are defined by cruciform stanchions 120, which are received in corresponding cruciform sockets 121 in pallet 118. The cruciform stanchions 120 are arranged in staggered fashion in rows and columns, and are arranged such that two stanchions define diagonally opposite corners of a cell. In that manner, four stanchions define four cells, as illustrated in FIG. 7, which is believed to be the most efficient arrangement and one that requires a minimum number of stanchions. The cruciform stanchions 120 serve to locate stacks 72 of items 46 and hold them in place. Each cruciform stanchion 120 defines four inside corners 122 between adjacent arms of the stanchion. In the illustrated embodiment, in which the items 46 are represented by CDs, the inside corners 122 of diagonally opposite cruciform stanchions 120 receive diagonally opposite corners 128 of each CD case in a stack 72, thus holding the stacks 72 of items 46 in place. The cruciform stanchions 120 also provide position references to enable a gantry robot 30 to determine its position within a storage section 32.

Replenishment of Items

A replenishment station 74, as shown in FIG. 2, is preferably, although not necessarily, provided for each storage section 32. If a replenishment station 74 is provided, it should be located within the range of x and y motion of the gantry robot for the associated storage section 32. When provided, the replenishment station 74 may be used to temporarily hold one or more stacks 72 of low volume items 46 for transfer by the gantry robot 30 to a cell 70 to replenish a depleted stack 72. If desired, replenishment station 74 may be identical to a storage section in construction, or may simply comprise a base and a number of cruciform stanchions 130 for locating and engaging the corners of a stack 72 of low volume items 46. In the latter case, the cruciform stanchions 130 need not be as high as cruciform stanchions 120 since, by definition, stacks 72 will only remain at replenishment station 74 for a short period of time and therefore are less subject to shifting. Stand-offs, or spacers 132, are also provided between cruciform stanchions 130 to raise the bottom of the stack above the surface of the base of replenishment station 74, to provide room for the feet 98 of the rotatable fingers 84 of robot head 64 to rotate underneath a stack 72 of low volume items 46.

Stacks 72 of low volume items 46 may be placed at replenishment station 74 by any desired method, including manual stacking. However, transferring stacks of items from the replenishment station 74 into the storage area 28 is preferably done by the gantry robots. The replenishment of individual stacks 72 within a storage section 32 can be accomplished in the following manner. A gantry robot 30 is moved by the system controller 47 over a stack 72 of items to be picked up and put into storage section 32. The robot head 64 is moved downward in the z direction, vacuum effector 34 is retracted, and fingers 84 are extended. Fingers 84 are rotated, either before or while they are extended, so that feet 98 extend outwardly with respect to robot head 64. That is, the fingers 84 are rotated so they do not contact the edges of the stack 72 of items 46 to be picked up as robot head 64 descends. The fingers are extended far enough to be below the bottom of the bottommost item 46 in the stack 72. Once the fingers have been so extended, they are rotated so that feet 98 extend inwardly with respect to robot head 64 and extend under the bottommost item 46, as illustrated in FIG. 5. Robot head 64 is then moved upward in the z direction, the feet 98 engage the bottom out item 46 in the stack, and the stack is thus picked up by robot head 64.

Robot head 64 is then moved by the system controller 47 in the x and y directions to a position above the cell 70 where the stack is to be placed, and lowered in the z direction until the bottommost item comes to rest on the top surface of pallet 118. As those skilled in the art will understand from the figures, the feet 98 on rotatable fingers 84 are in alignment with circular openings 134. Circular openings provide room for the feet to extend below the top surface of pallet 118 and to rotate between inwardly extending and outwardly extending positions relative to robot head 64. This permits the bottommost item to rest on the top surface of pallet 118 before fingers 84 are rotated to release the stack 72. Once the stack has come to rest on pallet 118, rotatable fingers 84 are rotated so that feet 98 extend outward and clear the edges of stack 72, which allows the robot head 64 to move upward in the z direction and be withdrawn.

Of course, those skilled in the art will appreciate that this process can be reversed if it is desired to remove a stack of items from storage area 32.

System Operation

The operation of the system is illustrated in flowchart form in FIGS. 8 through 12.

Figure 8:
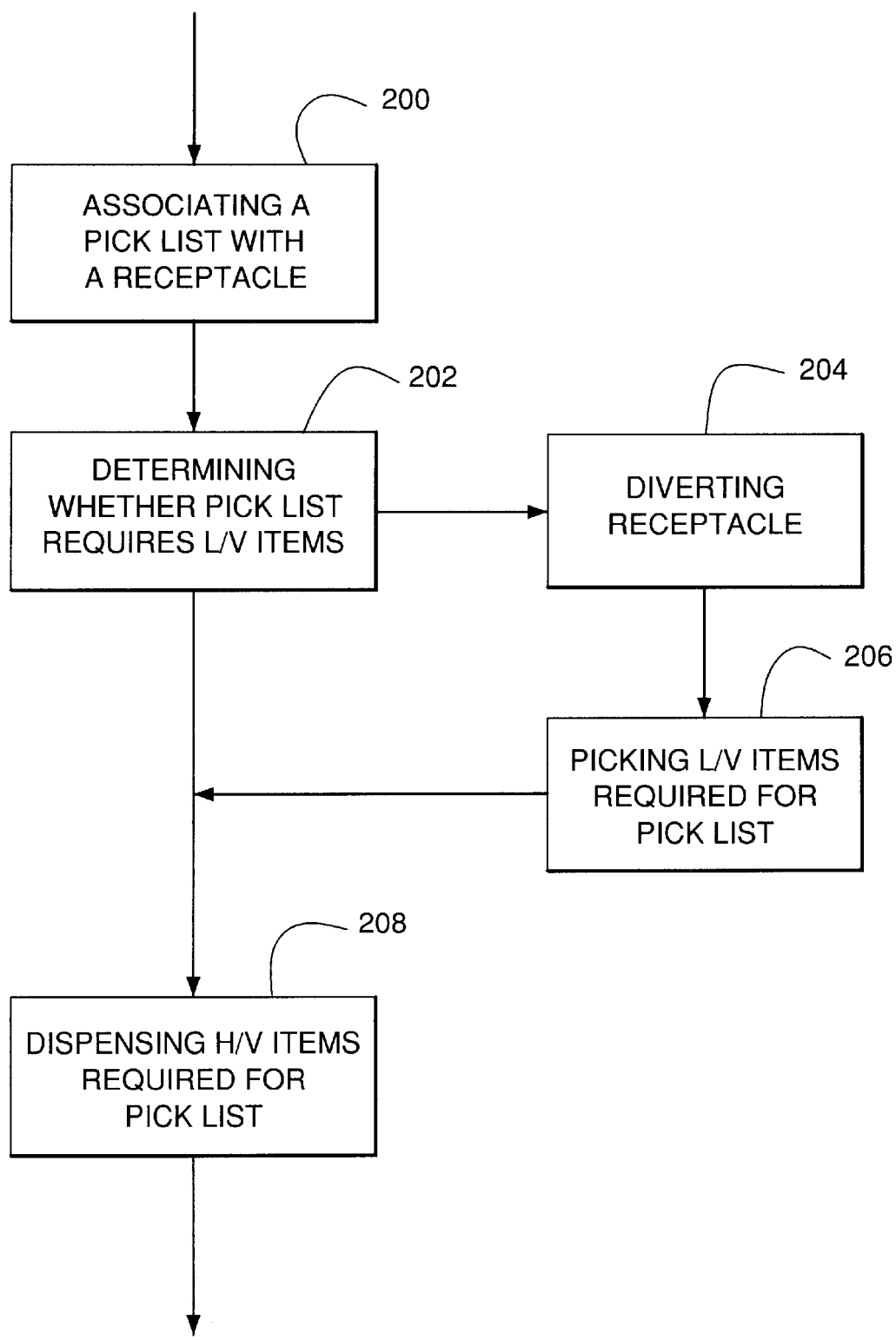
FIG. 8 is a process flowchart showing the basic steps of filling a purchase order according to the present invention.

As shown in FIG. 8, the operation of the system involves several basic steps. First, a pick list is associated with a receptacle (200). Next, it is determined (202) whether the pick list associated with the receptacle requires low volume items. If so, the receptacle associated with the pick list is diverted (204) to the low volume item storage area, where the low volume item or items are picked (206). After the low volume items required to fill a pick list are picked, the receptacle is directed to the high volume item dispenser area for picking of high volume items (208). Of course, it will be understood that, if a pick list does not require low volume items, steps 204 and 206 are not performed.

Associating a Pick List with a Receptacle

Figure 9:
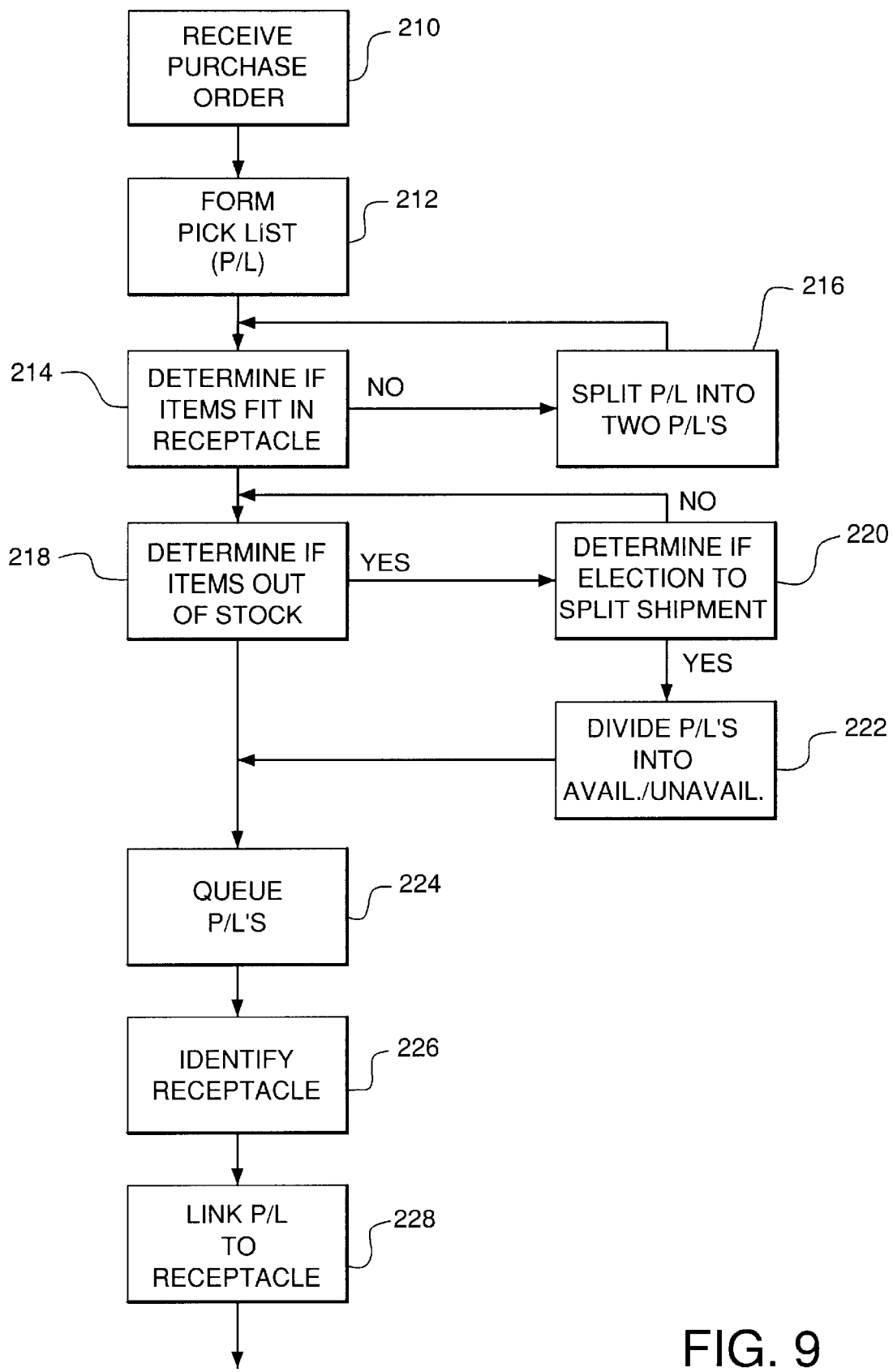
FIG. 9 is a process flowchart showing the steps of associating a purchase order with a receptacle.

The step 200 of associating a pick list with a receptacle is shown in greater detail in FIG. 9. The process begins with receipt of a purchase order (210). Typically included in a purchase order are not only a list of items ordered but also customer payment information and destination information (such as a shipping address) that do not need to be considered during the filling of the purchase order from the automated order filling system 20. This latter information removed from the purchase order (212) to form a pick list, which contains only the item information necessary to fill a purchase order. Specifically, the pick list need identify only the specific items and quantities required to fill an order, as well as an identifier to link the pick list with that order. If desired, a purchase order can be divided into several pick lists. This may be necessary when the ordered items will not fit within a single receptacle 22, or where an item is temporarily unavailable and the customer has expressed a willingness to take delivery of the ordered items in separate shipments.

After a pick list is created, it is next determined (214) whether all of the items on the pick list will fit within a single receptacle. If not, the pick list is divided (216) into separate pick lists, with each pick list remaining linked to the original purchase order. (Although a division into two pick lists is illustrated in the flow chart of FIG. 9, to should be understood that any number of pick lists can be created by division of the original pick list created in step 212.) Each separate pick list is then re-evaluated (214) to determine whether the items called for on the separate pick list will fit in a single receptacle 22. If not, each separate pick list is further divided. The process is repeated until the system is left with pick lists containing only those items that will fit within a single receptacle.

The next step (218) is to determine whether each item on the pick list is available. A customer can indicate whether the customer desires to have back-ordered items shipped separately from available items, or whether the customer desires to have shipment of the entire order delayed so the order can be shipped as a unit when all of the ordered items are available. If in step 218 it is determined that at least one ordered item is unavailable, it is next determined (220) whether the customer has indicated a willingness to allow unavailable items to be shipped at a later date. If the customer has expressed such a willingness, the pick list is divided (222) to form a pick list of available items and a pick list of unavailable items.

Once all pick lists of available items have been created from the purchase order, each pick list is placed in a queue for picking (224). The queue consists of orders waiting to be filled. Pick lists in the queue can be prioritized and placed in a sequence other than the sequence in which a purchase order was received. Prioritization can be based on the availability of items or the customer's willingness to pay extra for express service.

At the same time, receptacles are arriving at the conveyor 38. As each receptacle 22 enters the dispenser conveyor 38, the receptacle 22 is identified (226) by the order filling system 20. As described above, each receptacle 22 has a unique identifier 42, which may, for example, be a bar code, such that the system controller 47 can identify (226) the particular receptacle. Bar codes on receptacles 22, as in the illustrated embodiment, can be scanned by commonly used bar code readers connected to the system controller 47.

Pick lists in the queue are associated with receptacles as receptacles arrive on the dispenser conveyor. Once the unique identity of a receptacle has been determined, the system controller 47 associates (228) a pick list with the receptacle.

Determining Whether Low Volume Items are Required

Figure 10:
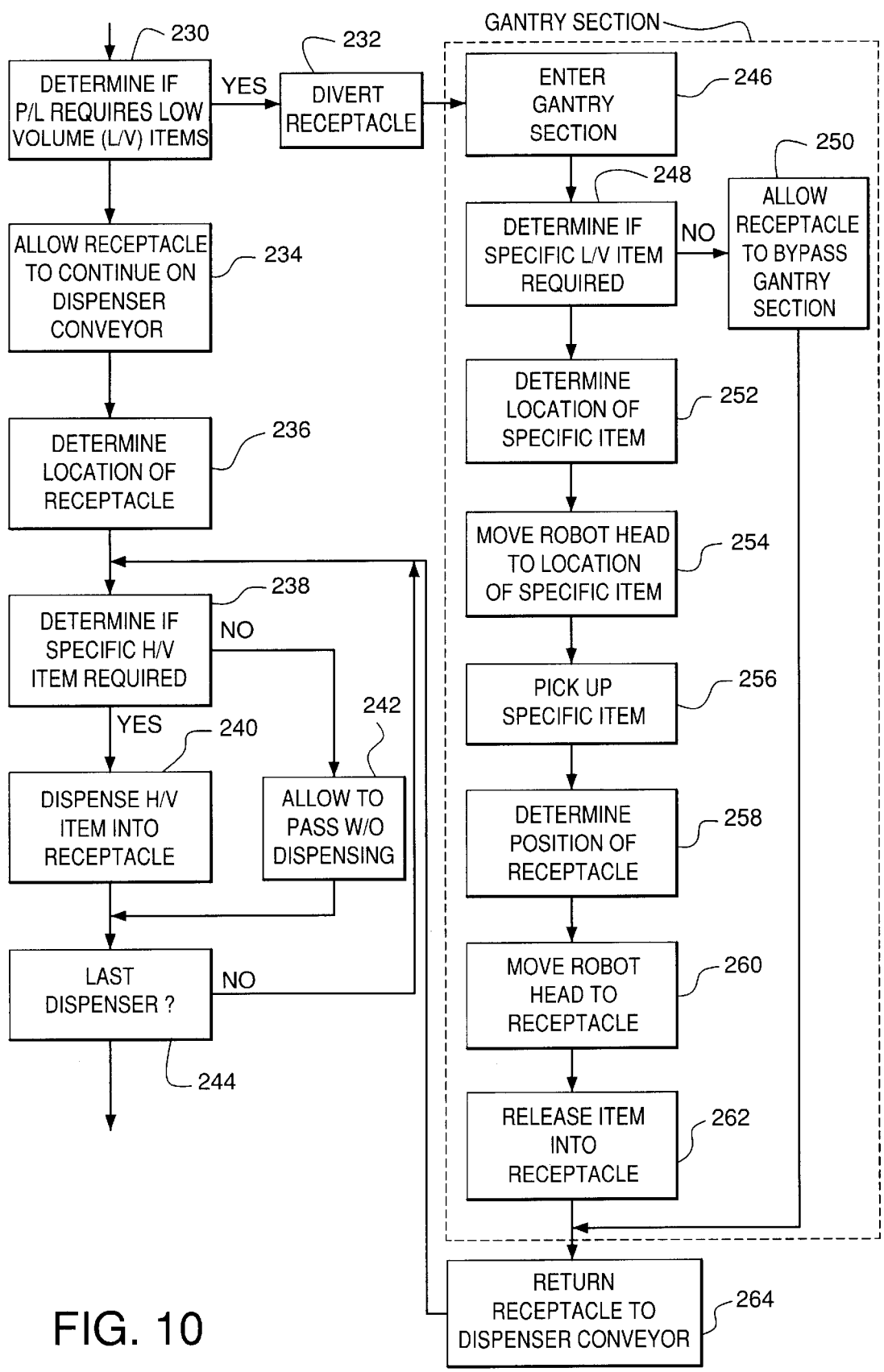
FIG. 10 is a process flowchart showing the steps of filling a pick list.
Figure 11:
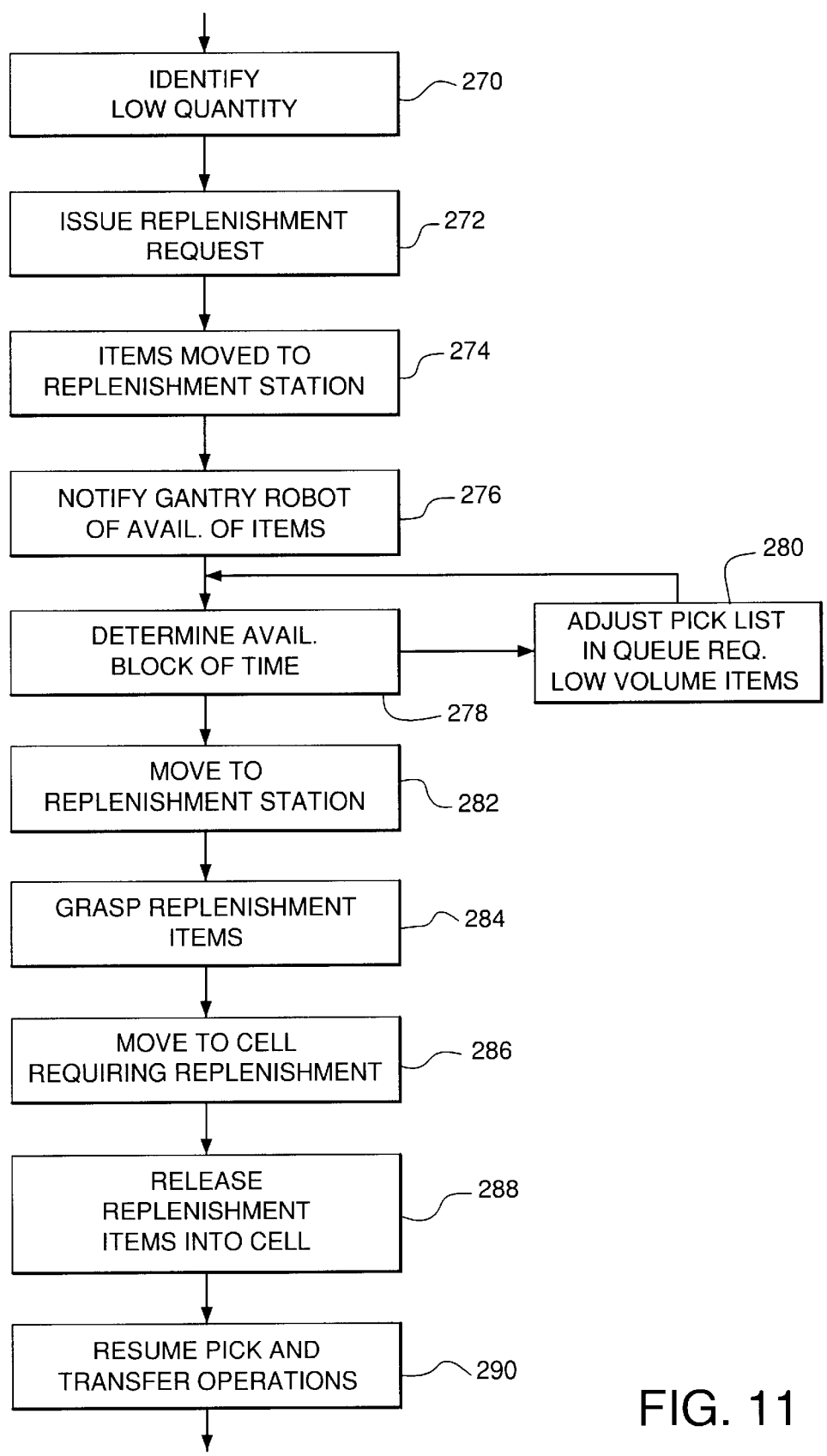
FIG. 11 is a process flowchart showing the steps of replenishing an item in a storage section.

As shown in FIG. 10, after the pick list is associated (220) with a receptacle, the pick list is examined (230) to determine whether the items on the pick list include low volume items. If low volume items are required, an indicator or flag can be set in the system controller 47 signifying that low volume items need to be picked. Alternatively, a low volume flag can be set as part of the original pick list, or the determination of whether low volume items are required can be made immediately prior to the receptacle 22 reaching the diverter 48.

As the receptacle 22 approaches the diverter 48, the diverter is positioned to either allow the receptacle 22 to continue on the dispenser conveyor 38 or, if low volume items are required, to divert (232) the receptacle 22 to the inventory area conveyor 50.

Dispensing High Volume Items

When the pick list does not include low volume items 46, the receptacle is allowed (234) to continue on the dispenser conveyor 38. The location of the receptacle must be determined (236) so that the system controller 47 can signal high volume dispensers 24 when a high volume item is to be dispensed into the proper receptacle 22. One method of determining the location of the receptacle is by determining when the receptacle is at a known location, and then calculating, from the speed of the conveyor and the time elapsed since the receptacle passed the known location, the present location of the receptacle. The same information can be used to predict the future position of a receptacle on the conveyor, as well. The conveyor can include sensors 138, such as optical sensors, at specific points along the conveyor.

As the receptacle passes each dispenser, the system controller 47 determines (238) whether the item contained within the dispenser is required to fill the pick list. If so, the system controller 47 signals the dispenser to dispense (240) an item into the receptacle. If the item is not required, the receptacle simply passes (242) the dispensers, without an item being dispensed. This process is repeated until the receptacle has passed the last dispenser along the dispenser conveyor (244).

Picking Low Volume Items

If the system controller 47 has determined that a pick list requires low volume items, the receptacle associated with that pick list is diverted to the inventory area where low volume items are stored for picking, as already noted. Also as already noted, the inventory area 28 may be made up of several storage sections 32, each with its own gantry robot 30. Thus, the system controller 47 must first determine (248) whether an item from the first storage section along the path of conveyor 50 is required to fill the pick list. If not, the system controller 47 allows (250) the receptacle 22 to pass through that storage section. If the system controller 47 determines (248) that an item from that storage section is required to fill the pick list, it next searches its memory to determine (252) the location of the required item. That is, the system controller 47 must determine in which cell 70 within the storage section the required item is located. Once it does so, it signals (254) the robot head 64 to move to the location of the required item 36 and pick up the item (256). The system controller 47 must also determine (258) a future position of the receptacle along the conveyor 50, taking into account the location of the robot head and the time it will take the robot head to move to a position over the conveyor 50 where it can drop the required item into the proper receptacle. That is, the system controller 47 must be able to determine when the receptacle 22 will be at a location where the gantry robot 30 can drop the item and cause the gantry robot 30 to move to that position (260) in time to release the item (262) into the receptacle 22.

The system controller 47 can utilize either position predicting or location determining methods for coordinating the movement of the robot head relative to the dynamically changing location of a specific receptacle 22 along conveyor 50. One suitable method uses a position locating system in which position sensors 138 continuously determine the position of a receptacle 22. As one example, such sensors can respond to interruption of a light beam when a receptacle 22 passes a location along the inventory area conveyor 50. As shown in FIG. 2, a typical sensor 142 which responds to light interruption uses a light beam 144 directed across the conveyor from a light source 146 and a photosensor 148 opposite the light source 146, such that passage of a receptacle 22 between the light source 146 and sensor 148 interrupts the light beam 144.

The above-described process is repeated for each storage section 32 through which receptacle 22 passes, including the second pass through the storage sections.

Once the receptacle 22 has traversed the entire length of the inventory area conveyor 50, the receptacle 22 is returned 264 to the dispenser conveyor 38.

The Replenishment Process

Individual picks by a gantry robot 30 can be tracked in the system controller 47 to monitor the quantities of individual items 36 in the inventory area 28. That is, each time the gantry robot 30 picks an individual item 36, the quantity of that item 36 known to be in inventory can be decremented to update a database which monitors the availability of items 36 in the inventory area 28. Thus, as each low volume item 46 is pulled from a stack 72, the system controller 47 decrements an inventory counter for that particular category of low volume item 46. As the number of specific low volume items is reduced by filling orders for that item, the system controller 47 determines when the stock of a specific low volume item is low and needs to be replenished (270). Such a determination is analogous to commonly used material requirements planning systems (MRPs), which determine reorder points based on the restocking time and frequency of distribution of the item. Once a replenishment set point is reached, a replenishment request is issued (272).

The replenishment order triggers the placement of the required items (274) at the replenishment station 74. Once the required items are placed at the replenishment station, the system controller 47 notifies (276) the gantry robot 30 of the availability of the items at the replenishment station 74.

After the gantry robot 30 is notified (276) of the availability of the items, the system controller 47 determines (278) the next available block of time in which the gantry robot 30 will not be required for transferring items to receptacles. When such a block of time is not immediately available, the system can adjust (280) the queue of pick lists being assigned to receptacles 22 to defer the pick lists requiring items that would be picked by the gantry robot until after the replenishment cycle has been completed.

Once the system controller 47 determines (278) that there is a suitable block of time for replenishing an item, it causes the gantry robot 30 to move (282) to the replenishment station 74 and grasp (284) the stack 72 of items 36 at the replenishment station 74, as explained above. Once the stack has been grasped, the gantry robot 30 moves to the cell requiring replenishment (286), and there releases (288) the items into the cell. Once the cell has been replenished, the gantry robot 30 resumes normal operation (290), individually picking low volume items 46 for transfer to receptacles 22.

Low Volume Only Pick Lists

Figure 12:
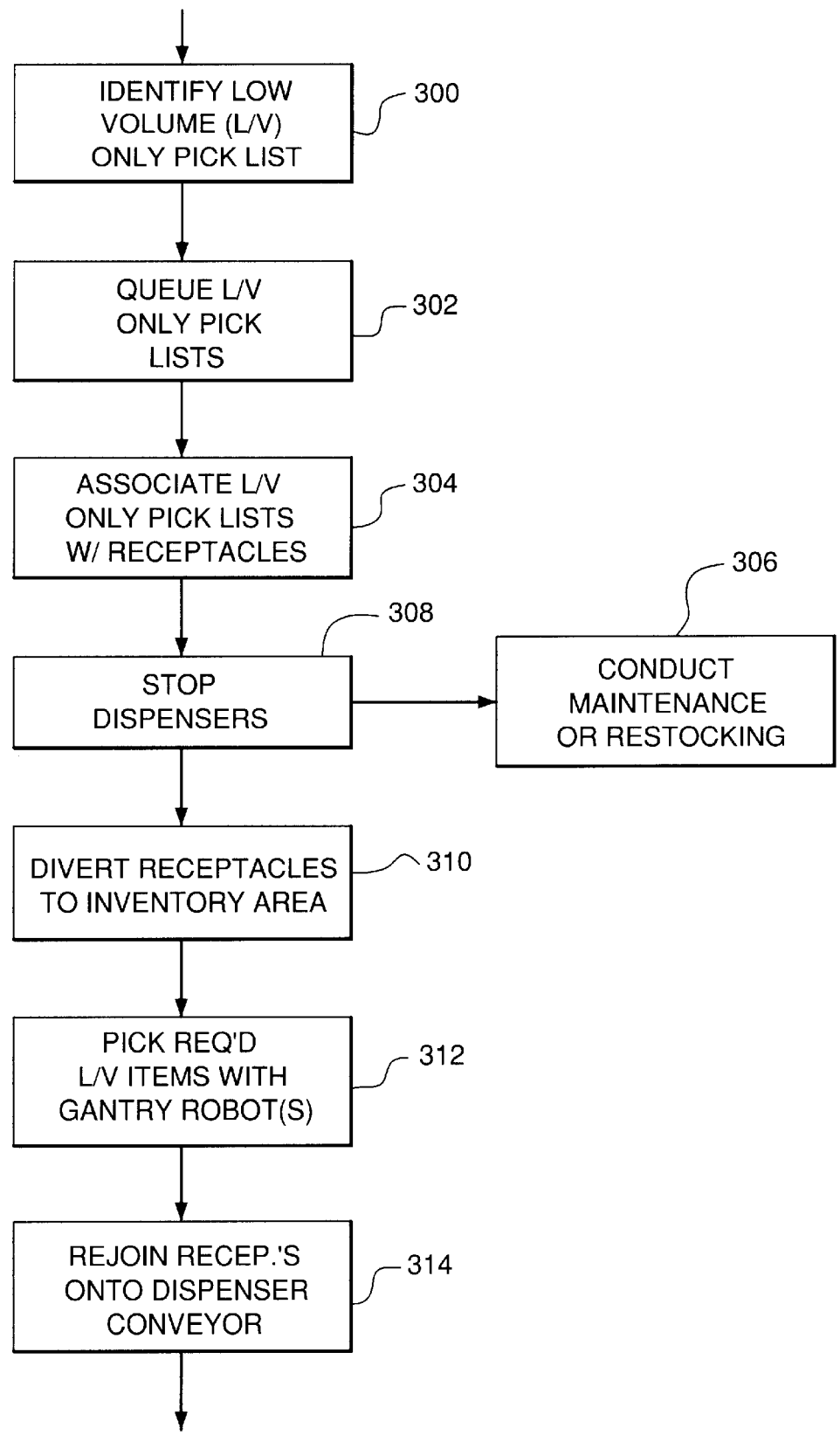
FIG. 12 is a process flowchart showing the steps of filling pick lists containing only low volume items.

When a pick list requires only low volume items, operation of dispensers 24 will not be required. If a series of only low volume item pick lists is entered into the system, the dispensers 24 can be taken off-line for maintenance or restocking without having to shut down the entire system. To allow restocking or maintenance of the high volume dispensers without affecting picking operations for low volume items, the process shown in FIG. 12 is used.

First, a group of pick lists requiring only low volume items is identified (300). Those pick lists are then queued (302) to form a series of pick lists requiring only low volume items. Those pick lists are associated (304) with receptacles 22 entering the order filling system 20, and the dispensers 24 are shut down (306). Maintenance or restocking of the high volume dispenses can then be conducted (308). The receptacles for the low volume only pick lists are diverted (310), as normal, onto the inventory area conveyor 50, where low volume items required to fill the pick lists are transferred (312) to the receptacles 22 by the gantry robots 30, as normal. Once the receptacle 22 has passed through the inventory area 28, the receptacles 22 rejoin (314) the dispenser conveyor 38.

Alternative Modes of Operation

Figure 13:
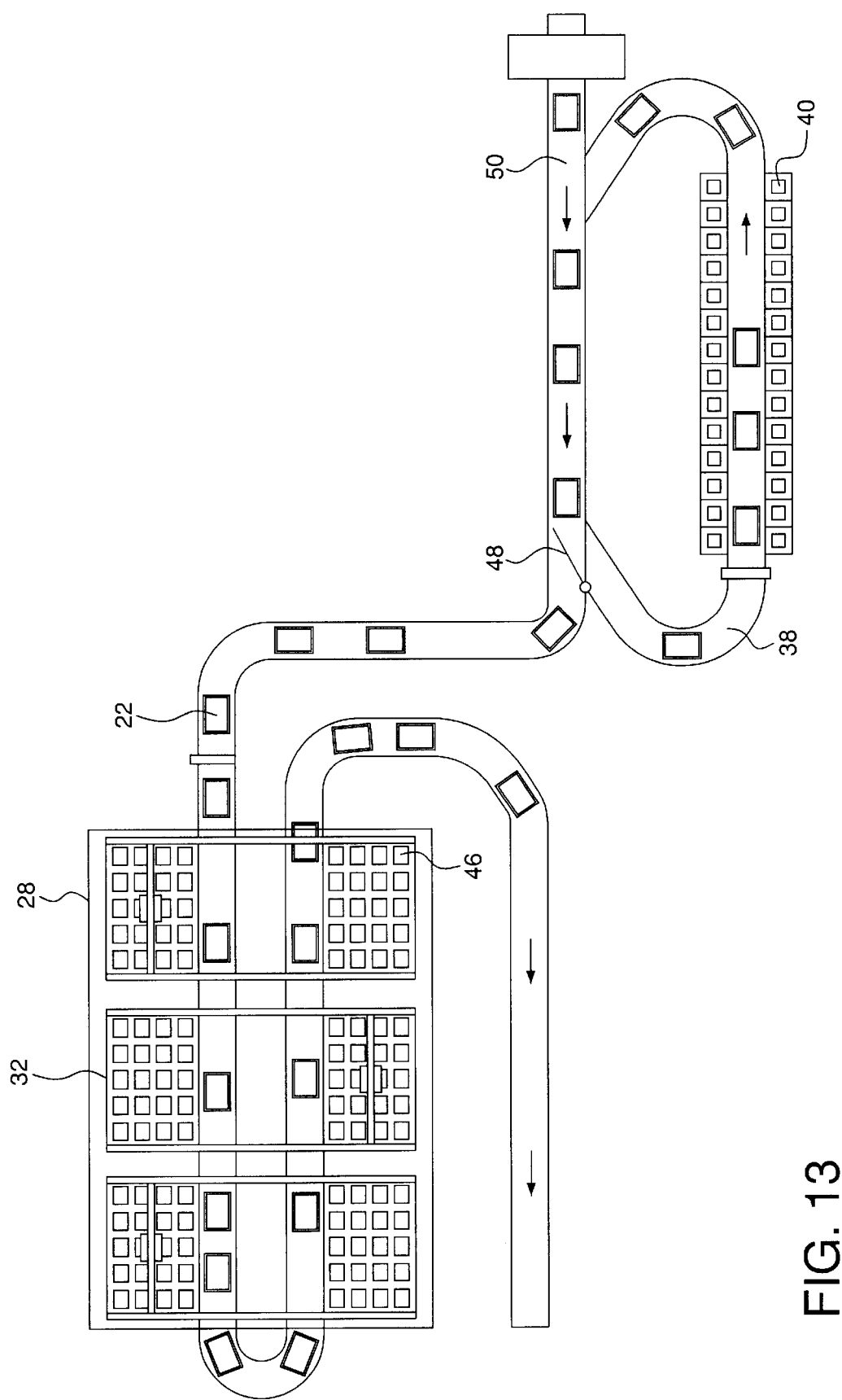
FIG. 13 is an overhead view of an alternative embodiment of the invention which uses an alternative routing of receptacles through the system.

It will be understood from the above description that the order filling system can utilize alternative arrangements of conveyors and picking equipment. In FIG. 13, an arrangement is shown in which the main path along which each receptacle 22 moves passes through the inventory area 28. In this embodiment, the diverter 48 diverts receptacles 22 from the inventory area conveyor 50 onto the dispenser conveyor 38 when high volume items 40 are required. If an item does not require high volume items 40, the receptacle is not diverted onto the dispenser conveyor 38.

Figure 14:
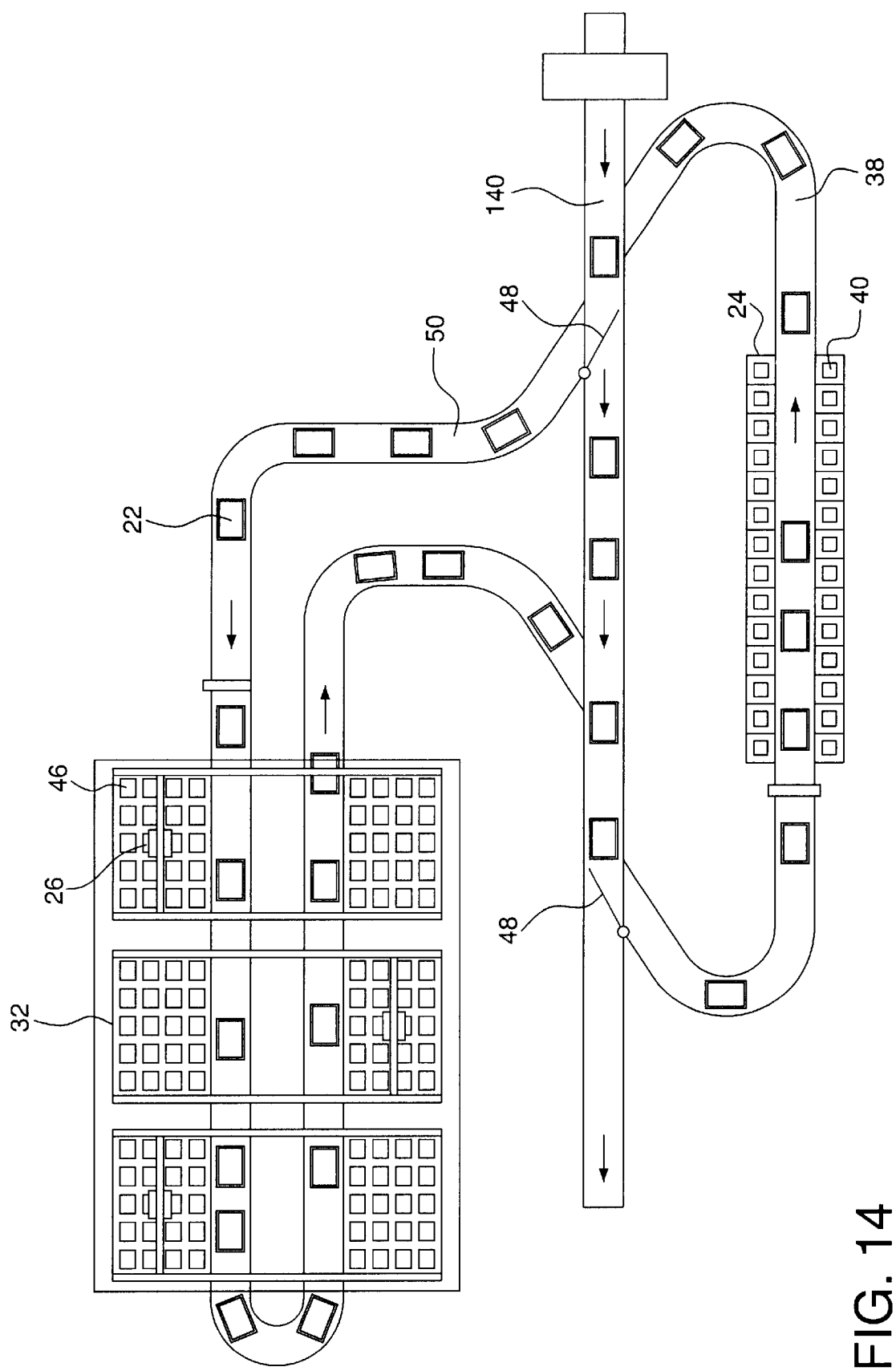
FIG. 14 is an overhead view of a second alternative embodiment of the invention which uses a second alternative routing of receptacles through the system.

Another alternative configuration is shown in FIG. 14. That configuration utilizes a pass-through conveyor 140 from which both the inventory area conveyor 50 and dispenser conveyor 38 branch. This configuration allows receptacles 22 to be diverted to only the dispenser conveyor 38 or only the inventory area conveyor 50, depending on whether the pick list associated with the receptacle 22 requires only high volume or only low volume items, respectively. Where both high volume and low volume items are required for a single pick list, receptacles 22 can be diverted first to the inventory area conveyor 50 and then to the dispenser conveyor 30, or vice versa, as required. This configuration also allows pick lists to be first sent to the dispensers 24 if low volume items 46 for the pick list are in the process of being replenished in a storage section 32, or first sent to the storage area if the high volume dispensers are being replenished or repaired.

High/Low Volume Determination

The invention permits adjustments in the status of items as low volume or high volume items based on the history of demand for specific items. This enables the user to decide whether a specific item should be dispensed from a dedicated dispenser 24, or whether it would be more effective to dispense the item from nondedicated picking equipment 26.

Classification of an item as a high volume item or a low volume item can be based on several factors related to optimizing the automated filling of purchase orders. A general discussion of those factors can be found in the *Materials Handling Handbook*, 2d Ed., Chapter 3, which identifies several factors relevant to estimating costs associated with providing automated equipment for materials handling.

Figure 15:
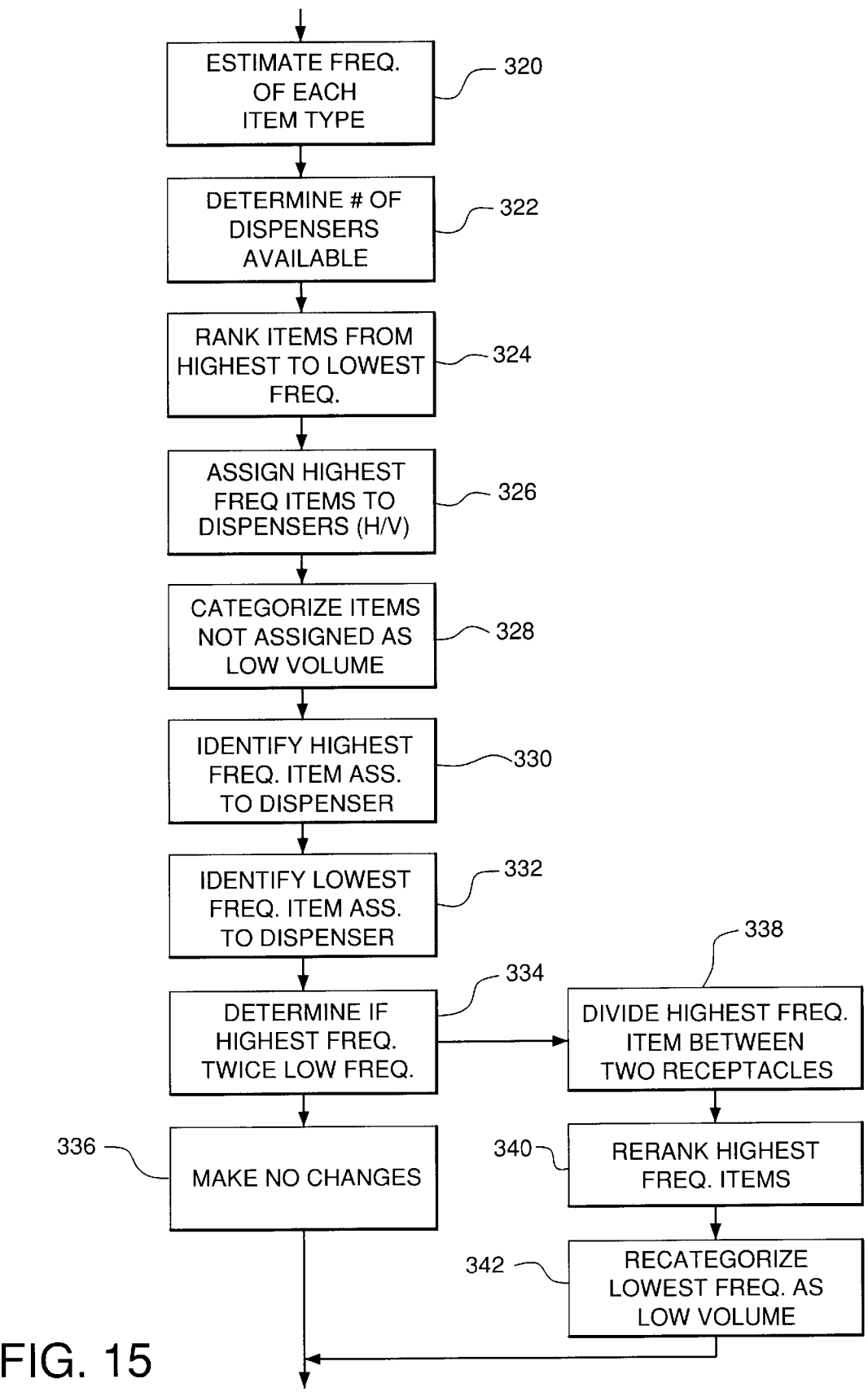
FIG. 15 is a process flowchart showing the steps of one method of determining whether items should be classified as low volume or high volume.

FIG. 15 shows a process for determining whether items should be categorized as high volume or low volume for a facility having a predetermined number of dedicated dispensers 24 and cells 70 within an inventory area 28. In order to maximize the number of orders which can be processed by the order filling system 20 in a given time period, the categorization of items as high volume or low volume is based on the capacity of the dedicated dispensers 24. In order to maximize the rate at which orders can be filled, it is desired to place the most frequently ordered items in the available dedicated dispensers 24.

As shown in FIG. 15, the first step in the process is estimating (320) the frequency with which each item will be needed to fill a pick list or purchase order. Next, the number of available dedicated dispensers 24 is determined (322). Next, the items are ranked (324) in order from highest estimated frequency of demand to lowest estimated frequency. The items expected to be dispensed at the highest frequency are assigned (326) to the available dedicated dispensers 24, with the remaining items being classified as low volume (328) and placed within the inventory area 28.

Where the highest frequency item has an expected frequency of being dispensed that is more than twice the frequency of the lowest frequency item which would be assigned to a dedicated dispenser, the assignment of items to dedicated dispensers 24 may be modified to have two dedicated dispensers 24 dispensing the highest frequency item. Assigning items with a high expected frequency of distribution to multiple dedicated dispensers can be of great value when the ability of a single dedicated dispenser 24 to dispense the item with the highest expected frequency of demand becomes the limiting factor on the rate at which orders can be filled.

In order to modify the classification of items when the item with the highest estimated frequency has a frequency more than twice as large as the estimated frequency of the lowest frequency item which would be assigned to a dedicated dispenser, the items are assigned (326) to the available dispensers 24 in order beginning with the highest frequency, until all available dispensers 24 have had an item assigned to them. Once the dispensers 24 have each had an item assigned, the item having the highest estimated frequency which is assigned to a dispenser 24 is identified (330). The item assigned to a dispenser 24 having the lowest estimated frequency is also identified (332). Next, a determination is made (334) whether the item with the highest estimated frequency has an estimated frequency more than twice that of the estimated frequency of the lowest frequency item assigned to a dispenser 24. If the highest frequency is at least twice that of the lowest type of item assigned to a dispenser, the item with the highest frequency can be divided (338) between two dedicated dispensers 24, with the item which had been assigned to a dispenser 24 being reclassified (342) as a low volume item and reassigned to the inventory area 28. The ranking of the items can then be redetermined (340), with the item which was divided between two dispensers 24 being considered as two items, each having a frequency equal to half of the estimated frequency of the item. If the highest frequency is not at least twice that of the lowest frequency, no changes are made (336). The process is repeated until no dispenser 24 is assigned an item having an estimated frequency less than half of the highest estimated frequency assigned to a dispenser 24.

From the foregoing description it will be apparent that the invention described herein provides a simple yet effective automated system for accumulating items required to fill purchase orders. As will be apparent to those familiar with the art, the invention may be embodied in other specific forms without departing from the spirit or essential characteristics thereof. The embodiment disclosed is therefore to be considered in all respects as illustrative rather than restrictive, the scope of the invention being indicated by the appended claims.

What is claimed is:

1. A method of automatically picking items to fill a purchase order, comprising the steps of:

providing an automated filling system having a plurality of receptacles for receiving ordered items, a high volume dispenser for rapidly dispensing frequently requested items from a high volume storage area, a low volume pick and place dispenser for dispensing items from a low volume storage area, and a controller for controlling whether the receptacles are conveyed to the high volume dispenser, the low volume dispenser or both, receiving a purchase order, extracting from the purchase order information about the identity and quantity of items ordered in the purchase order, creating from the extracted information a pick list, associating the pick list with a receptacle for receiving picked items, determining whether ordered items are located in the high volume storage area or the low volume storage area, selectably directing the receptacle to at least one of the high volume storage area and the low volume storage area, automatically dispensing ordered items stored at each storage area to which the receptacle is selectably directed and placing them in the receptacle, directing the receptacle to a location for further processing;

providing a pickup head at the low storage area which includes a vacuum pickup for picking up individual items to be placed in a receptacle, and a plurality of rotatable fingers for grasping a plurality of items in a single stack;

determining when an item in a storage area is at or below a threshold;

providing additional inventory of the item that is at or below the threshold;

translating a pickup head in the pick and place dispenser to the location of the additional inventory;

rotating the fingers for grasping the additional inventory;

transferring the additional inventory with the pickup head to a location in the storage area where additional inventory is needed; and releasing the additional inventory from the fingers.

2. The method according to claim 1 wherein the step of selectably directing the receptacle involves:

determining a route in the automated filling system for conveyance of the receptacle to retrieve ordered items;

tracking the location of the receptacle in the automated filling system; and controlling conveyance of the receptacle based at least in part on the location of the receptacle in the automated filling system.

3. The method according to claim 2 wherein the receptacle is first directed to the high volume storage area, then directed to the low volume storage area.

4. The method according to claim 2 wherein the receptacle is first directed to the low volume storage area, then directed to the high volume storage area.

5. The method according to claim 2 wherein the step of controlling conveyance involves channeling of the receptacle from one conveyor to another.

6. The method according to claim 2 wherein the tracking of the receptacle is provided by automatically reading a bar code label on the receptacle.

7. The method according to claim 1 further comprising the step of associating items with storage areas based on their frequency of purchase.

8. A method of automatically picking items to fill a purchase order, comprising the steps of providing an automated filling system having a plurality of receptacles for receiving ordered items, a high volume dispenser for rapidly dispensing frequently requested items from a high volume storage area, a low volume pick and place dispenser for dispensing items from a low volume storage area, and a controller for controlling whether the receptacles are conveyed to the high volume dispenser, the low volume dispenser or both, receiving a purchase order, extracting from the purchase order information about the identity and quantity of items ordered in the purchase order, creating from the extracted information a pick list, associating the pick list with a receptacle for receiving picked items, determining whether ordered items are located in the high volume storage area or the low volume storage area, if no item in the low volume storage area is ordered,
  i. directing the receptacle to the high volume storage area, and
  ii. automatically dispensing ordered items stored at the high volume storage area into the receptacle, if at least one item in the low volume storage area is ordered,
  i. first directing the receptacle to the low volume storage area,
  ii. automatically picking items on the pick list from the items stored in the low volume storage area and placing them in the receptacle, and if at least one item in the high volume area is also ordered,
  i. next directing the receptacle to the high volume area,
  ii. automatically dispensing ordered items stored at the high volume area into the receptacle, and
  iii. directing the receptacle to a location for further processing, if at least one item in the low volume storage area is ordered and no item in the high volume area is also ordered, directing the receptacle to a location for further processing after items from the low volume area have been picked and placed in the receptacle;

providing a pickup head at the low storage area which includes a vacuum pickup for picking up individual items to be placed in a receptacle, and a plurality of rotatable fingers for grasping a plurality of items in a single stack;

determining when an item in a storage area is at or below a threshold;

providing additional inventory of the item that is at or below the threshold;

translating a pickup head in the pick and place dispenser to the location of the additional inventory;

rotating the fingers for grasping the additional inventory;

transferring the additional inventory with the pickup head to a location in the storage area where additional inventory is needed; and releasing the additional inventory from the fingers.

9. The method according to claim 8 wherein the steps of directing the receptacle involve channeling the receptacle from one conveyor to another.

10. The method according to claim 8 further comprising the steps of tracking the location of the receptacle in the automated filling system based on a unique identifier associated with the receptacle; and wherein the steps of directing the receptacle involve are based at least in part on the location of the receptacle in the automated filling system.

11. The method according to claim 10 wherein the tracking of the receptacle is provided by automatically reading a bar code label on the receptacle.

12. The method according to claim 8 further comprising the step of associating items with storage areas based on their frequency of purchase.

13. A system for automatically picking items to fill a purchase order, comprising at least one receptacle for receiving items ordered in the purchase order, the receptacle having associated with it unique identifying information;

a conveyor for moving the receptacle along a preselected path;

a detector along the path for detecting the unique identifying information associated with the receptacle and generating an output signal representative of that information;

a system controller which
  i. receives the detector output signal and information about the identity and quantity of items ordered in the purchase order,
  ii. correlates the unique identifying information with the information about the identity and quantity of items ordered in the purchase order, and
  iii. generates commands;

a high volume storage area located along a first portion of the path of the conveyor for storing items which are frequently ordered;

a low volume storage area located along a second portion of the path of the conveyor for storing items which are less frequently ordered than the items in the high storage area;

a director responsive to a command from the controller to direct a receptacle onto the second portion of the path when items located in the low volume storage area are ordered in the purchase order;

at least one picking robot at the low volume storage area responsive to a command from the controller to pick items located in the low volume storage area that are ordered in the purchase order and place the items in the receptacle;

at least one dispenser at the high volume storage area responsive to a command from the controller to dispense items located in the high volume storage area that are ordered in the purchase order into the receptacle; and wherein the at least one picking robot includes a manipulator a vacuum pickup for picking up individual items to be placed in a receptacle, the vacuum pickup including a contact member for sealingly engaging an item, and a vacuum line for supplying negative pressure to the contact member, and a plurality of rotatable fingers for grasping a plurality of items in a single stack, each finger being extendable for extending downward past the contact member and having feet which, when the fingers are rotated, rotate toward and away from the contact member.

14. A system according to claim 13 wherein the plurality of fingers are attached to the manipulator such that the fingers extend substantially simultaneously.

15. A system according to claim 13 wherein each item in the high volume area includes its own dispenser.

16. A system according to claim 13 wherein the picking robot includes a gantry and wherein the manipulator is movably mounted to the gantry, the gantry permitting the manipulator to move between the stored items and the conveyor, and between the stored items and an inventory replenishment area.

17. A system according to claim 13 wherein the conveyor includes a first portion extending through the high volume storage area and a second portion extending through the low volume storage area.

* * * * *